(12) United States Patent
Verenchikov et al.

(10) Patent No.: US 10,770,280 B2
(45) Date of Patent: Sep. 8, 2020

(54) RIGHT ANGLE TIME-OF-FLIGHT DETECTOR WITH AN EXTENDED LIFE TIME

(71) Applicant: LECO Corporation, St. Joseph, MI (US)

(72) Inventors: Anatoly N. Verenchikov, St. Petersburg (RU); Aleksey Vorobyev, St. Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 366 days.

(21) Appl. No.: 15/301,249

(22) PCT Filed: Mar. 31, 2015

(86) PCT No.: PCT/US2015/023607
§ 371 (c)(1),
(2) Date: Sep. 30, 2016

(87) PCT Pub. No.: WO2015/153622
PCT Pub. Date: Oct. 8, 2015

(65) Prior Publication Data
US 2017/0025265 A1    Jan. 26, 2017

Related U.S. Application Data

(60) Provisional application No. 61/973,146, filed on Mar. 31, 2014.

(51) Int. Cl.
*H01J 49/40* (2006.01)
*G01T 1/20* (2006.01)
*H01J 49/02* (2006.01)

(52) U.S. Cl.
CPC .............. *H01J 49/406* (2013.01); *G01T 1/20* (2013.01); *H01J 49/025* (2013.01)

(58) Field of Classification Search
CPC ....... H01J 49/025; H01J 49/40; G01T 1/2006; G01T 1/20
See application file for complete search history.

(56) References Cited

U.S. PATENT DOCUMENTS 4,810,882 A * 3/1989 Bateman .................... G01T 1/28
                                                              250/281
5,043,583 A * 8/1991 Robinson .............. H01J 37/244
                                                              250/361 R (Continued)

FOREIGN PATENT DOCUMENTS

CN          102782800 A      11/2012
DE     112014002092 T5      12/2015

(Continued)

OTHER PUBLICATIONS

International Search Report dated Jul. 30, 2015, relating to International Application No. PCT/US2015/023607.

(Continued)

*Primary Examiner* — Eliza W Osenbaugh-Stewart
(74) *Attorney, Agent, or Firm* — Honigman LLP

(57) ABSTRACT

There is proposed a right angle time-of-flight detector comprising a conductive converter for emitting and accelerating secondary electrons, a magnetic field formed by at least one magnet for deflecting the secondary electrons at a right angle and a sealed photo-multiplier. The detector is expected to provide an extended resource and dynamic range and may be fit into tight assemblies, such as MR-TOF MS.

16 Claims, 20 Drawing Sheets

(56) References Cited

U.S. PATENT DOCUMENTS

| | | | |
|---|---|---|---|
| 5,656,807 A * | 8/1997 | Packard | H01J 43/246 250/214 VT |
| 2004/0061054 A1 * | 4/2004 | Kondo | H01J 29/385 250/310 |
| 2004/0159796 A1 * | 8/2004 | Stresau | H01J 43/04 250/396 R |
| 2005/0056779 A1 | 3/2005 | Chefetz et al. | |
| 2008/0272291 A1 | 11/2008 | Vestal | |
| 2011/0095178 A1 * | 4/2011 | Giannakopulos | H01J 49/025 250/282 |
| 2012/0025085 A1 * | 2/2012 | Kotani | G01T 1/185 250/361 R |
| 2013/0119249 A1 | 5/2013 | Niehuis | |
| 2014/0077076 A1 | 3/2014 | Satoh | |

FOREIGN PATENT DOCUMENTS

| | | |
|---|---|---|
| EP | 0278034 A1 | 8/1988 |
| EP | 0281413 A2 | 9/1988 |
| EP | 1365260 A1 | 11/2003 |
| EP | 2491573 A2 | 8/2012 |
| JP | S62040148 A | 2/1987 |
| WO | WO-2005001878 A2 | 1/2005 |
| WO | WO-20110135477 A1 | 11/2011 |
| WO | WO-2013045947 A1 | 4/2013 |
| WO | WO-2013067366 A2 | 5/2013 |
| WO | WO-2013192161 A2 | 12/2013 |

OTHER PUBLICATIONS

Japanese office action for the related application No. 2016-560339 with it's English translation thereof.
Chinese Office Action for related application No. 201580025919.9 dated Aug. 29, 2017.
German Office Action for the related Application No. 112015001542.6 dated Dec. 22, 2017.
First Examination Report for Application No. GB1616443.6 dated Feb. 21, 2020.

* cited by examiner

RIGHT ANGLE TIME-OF-FLIGHT DETECTOR WITH AN EXTENDED LIFE TIME

CROSS-REFERENCE TO RELATED APPLICATIONS

This application claims priority under 35 U.S.C. § 371 to Patent Cooperation Treaty Application No. PCT/US2015/023607, filed Mar. 31, 2015, which claims priority under 35 U.S.C. § 119(e) to U.S. Provisional Application No. 61/973,146, filed Mar. 31, 2014. The disclosures of these prior applications are considered part of the disclosure of this application and are hereby incorporated by reference in their entireties.

TECHNICAL FIELD

This disclosure generally relates to mass spectroscopic analysis and more specifically relates to improving the dynamic range and life time of detectors for time-of-flight mass spectrometers and multi-reflecting time-of-flight mass spectrometers.

BACKGROUND

Detection of individual ions in time-of-flight mass spectrometers (TOF MS) requires nanosecond-level detector speeds and approximately 1E+6 gain. Detector's dynamic range and life time are the primary concerns. Parameters of existing time-of-flight detectors limit the combination of resolution, speed, dynamic range, and robustness. Typical TOF detectors have 1 Coulomb resource, measured by the output current, while modern pulsed ion sources may form ion fluxes up to 1E+9 ion/sec. At 1E+6 gain the detector's output current reaches 0.1 mA and, thus, lifetime is limited to 10000 second (3 hrs) only.

Dual microchannel plate (MCP) detectors are capable of sub-nanosecond-detection speeds at 1E+6 gain. However, they saturate at ion fluxes above 1E+6 ion/sec/cm$^2$ and their resource is limited to approximately 1 Coulomb (1 C). Currently dual MCPs are used either for weak ion sources or at a reduced gain, which results in missing individual ion signals and limiting the TOF MS dynamic range.

Secondary electron multipliers (SEM) built of discrete dynodes may reach 1-2 ns time response per individual ion (the 268 model SEM by ETP is a typical example), however, ion to electron converters are of small size, are prone to non-uniform electron collection, and form bogus signals related to secondary negative ions. When SEM is exposed to a technical vacuum, its active surfaces also deteriorate at approximately 1 C output charge, and thus strongly limiting both the associated dynamic range and the associated life time.

Daly detectors employ an intermediate conversion of electrons into photons, photon detection, and electron amplification within a photo-multiplier tube (PMT). Use of sealed PMT strongly enhances the detector resource and life time. In more detail, detected ions hit a kV biased metal electrode and emit secondary electrons. Electrostatic field assists electron collection onto a scintillator. High energy electrons emit photons from the scintillator. Photons are detected by a PMT. However, such detectors were not intended for detecting fast signals. Primary converters form a large (i.e. tens to hundreds of nanoseconds) spread at ion arrival. Electron collection does spread the signal for at least several nanoseconds. Secondary negative ions form additional peaks, which are shifted in time.

Recently emerged hybrid detectors are better suited for detection of fast signals in TOF MS. They also employ electron-to-light conversion and light detection by a sealed PMT. Typical hybrid detectors comprises a single MCP (which faces the ion beam and amplifies a single ion to approximately 300-1000 electrons), a scintillator beyond the MCP, and a sealed PMT. Some fast PMT, like the 9880 model by Hamamatsu, provide up to 300 C resource at rise times in the neighborhood of 0.6 nanoseconds. However, the MCP itself is suspected to limit the maximal ionic flux and life time. Besides, electron amplification by the MCP leads to a faster degradation of the scintillator by depleting the thin metal coating on top of the scintillator and destroying the scintillator surface. Experiments have shown that commercial hybrid detectors run out much faster compared to the life time of sealed PMT.

Multi-reflecting TOF mass spectrometers (MR-TOF MS) add an additional constraint to the TOF detector—namely, there is very limited space available for the detector, and a right-angled detector is highly preferred. Recent additions to fast pulsing methods as described in WO2011135477, WO2013192161, and WO2013067366 (each of which are incorporated herein by reference) pose a requirement for detectors large ionic doses and large resource. Fast pulsing in MR-TOF MS introduces another requirement for TOF detectors—avoiding the pick-up of high voltage pulses, which frequently occur within a pulsed converter.

SUMMARY

Addressing the aforementioned issues and generally approving TOF detectors, the inventors propose, in this disclosure, a time-of-flight detector with right angle mounting, having an extended life time and immunity to pick up noise. The proposed TOF detector is particularly suitable for MR-TOF MS and could be used in other types of TOF MS.

The TOF detector of this disclosure includes a right angle magnetic converter, a fast organic scintillator, and a sealed PMT with large resource. Unlike existing hybrid detectors, the TOF detector of this disclosure omits an MCP stage, while enhancing electron collection and improving the light collection for high probability of single ion detection. To further extend detector life time, inventors propose replacing the thin (1 μm range) metal coating of the hybrid detectors by a deposited or covering metal mesh serving primarily to removing static charges. Both measures allow substantial improvement of the detector's dynamic range and life time.

The proposed magnetic converter is arranged to effectuate a slight (several hundred volts) ion acceleration; thus, accelerating secondary electrons to a controlled energy for accurate steering of the electrons towards the scintillator by a cross magnetic field in a range of 30 Gauss to 300 Gauss and having negligible effect onto ion motion. As disclosed herein, the proposed detector geometry not only minimizes time-of-flight distortions at the detection stage, but also allows accurate compensation of the first and the second order time per space aberrations of the MR-TOF or TOF analyzer.

The proposed right angle magnetic converter may be further enhanced by spatial focusing of secondary electrons by a non-uniform magnetic field accomplished with a controlled magnet displacement from the detector axis. To improve photon collection past the scintillator, options include: (i) focusing of secondary electrons onto the scintillator center; (ii) using a thin wall scintillator; (iii) placing the scintillator directly onto a PMT surface or light guide; and (iv) using optical coupling grease or glue to avoid internal reflection of light. Separate assemblies of the converter and of the scintillator allow using high voltage bias for secondary electrons (up to 10 kV-15 kV), to enhance electron to light conversion gain. Replacing the scintillators metal coating (as in Photonics hybrid detector) by a coating or deposited mesh also eliminates energy loss of secondary electrons and enhances photon emission.

The proposed right angle magnetic converter allows right angle mounting of the PMT light detector while providing minimal time distortions at the ion propagation and the electron collection stages. Preferably, the converter may be mounted directly onto a TOF analyzer, which allows generally precise converter alignment and quick access and installation of other detector parts. The right angle converter allows inserting a detector into tight assemblies, such as an MR-TOF MS. If using an optional light guide between the scintillator and the PMT, the detector also allows mounting the PMT remote from the analyzer, and even at an atmospheric side. Those advantages also allow convenient electromagnetic shielding and cooling of the PMT, which reduces noise and pulse pick up at the PMT signal line.

The proposed magnetic converter allows compensation of a time-front tilt and of spherical T|XX aberrations by varying an extraction field and using a curved converter surface. This is estimated to have a significant impact on the resolution of MR-TOF, because MR-TOF induces intrinsic first and second order aberrations due to ion focusing and steering in a so-called drift direction.

Skipping the MCP stage introduces an additional problem—the appearance of slow fluorescence at approximately 15% of a main ionic signal. A solution to this problem includes dedicated and described below algorithms for subtracting slow fluorescence signal component.

This disclosure describes experimental tests of the proposed detector which confirmed: extended life time; excellent detection efficiency of individual ions; fast time response; immunity to noise and pulse signals; and practical convenience of detector mounting and replacement.

In another embodiment, for TOF MS applications with a limited ionic flux, there are proposed a version of the above described detector with an additional SEM or MCP stage and a method for suppressing slow fluorescence by setting amplification between primary ions and primary PMT electrons above 10-times and setting a threshold for suppressing individual photons produced by slow fluorescence. The proposed detector employs multiple other means proposed to enhance detector efficiency to minimize MCP amplification and, thus, extending life time of the hybrid detector. There are also proposed several convenient designs for flexible changes between detector sets, including right angle steering of secondary electrons past the MCP.

According to the first aspect of the disclosure, a time-of-flight detector, for the purpose of extending dynamic range and life time, includes a conductive converter, at least one electrode with a side window, at least one magnet, a scintillator, and a sealed photo-multiplier. The conductive converter is exposed parallel to a time-front of detected ion packets and generates secondary electrons. The converter is negatively floated relative to the electrode with the side window by a voltage difference between 50V and 1000V. The at least one magnet bends electron trajectories towards the side window with a magnetic field strength in an electron propagation region between 10 and 1000 Gauss. The scintillator is floated positively relative to the converter surface by 1 kV to 20 kV and is located past the electrode window at 45 to 180 degrees relative to the converter. The sealed photo-multiplier past the scintillator.

Implementations of this aspect of the disclosure mat include one or more of the following features. The scintillator is optionally either coated or covered by a conductive mesh for removing a surface charge from the scintillator surface. In some examples, the scintillator is optically coupled to the photo-multiplier window. In some implementations, the at least one magnet position is adjusted for spatial focusing of the secondary electrons by a curvature of the magnetic field. Optionally, the converter surface is curved or stepped for compensating time-per spatial spherical aberrations. The converter surface is optionally electronically tilted relative to the time front of the ion packets by applying a potential bias at or past the side window.

In some examples, the detector further comprises a mesh or discrete dynode electron amplifier between the converter and the scintillator. In some implementations, the detector further comprises a microchannel plate set at electron amplification gain under 100. In some examples, the detector further comprises an elongated optical coupling between the scintillator and the sealed photomultiplier, and the photomultiplier is placed on the atmospheric side for improved access or replacement and for improved electromagnetic shielding and thermal cooling.

Optionally, the detector may be part of a multi-reflecting mass spectrometer.

According to the second aspect of the disclosure, a right angle time-of-flight detector includes a single microchannel plate, an electrostatic bender of secondary electrons, a scintillator, and a sealed photo-multiplier. The single microchannel plate converts the detected ion packets into secondary electrons. The scintillator is floated positively relative to the microchannel plate by 1 kV to 20 kV and is located past the microchannel plate at 45 to 180 degrees. The sealed photo-multiplier is located past the scintillator.

Implementations of this aspect of the disclosure may include one or more of the following features. In some implementations, an electromagnetic shielding associates with the sealed photo-multiplier. In some examples, the right angle time-of-flight detector further comprises a mesh-based secondary electron multiplier that accepts the secondary electrons from a converter. Optionally, the scintillator is optically connected to the sealed photo-multiplier through a light transmitter.

The details of one or more implementations of the disclosure are set forth in the accompanying drawings and the description below. Other aspects, features, and advantages will be apparent from the description and drawings, and from the claims.

DESCRIPTION OF DRAWINGS

Various embodiments of the present invention—together with arrangements given for illustrative purposes only—will now be described, by way of example only, and with reference to the accompanying drawings in which.

Like reference symbols in the various drawings indicate like elements.

DETAILED DESCRIPTION

Problems of Prior Art TOF Detectors

Figure 1:
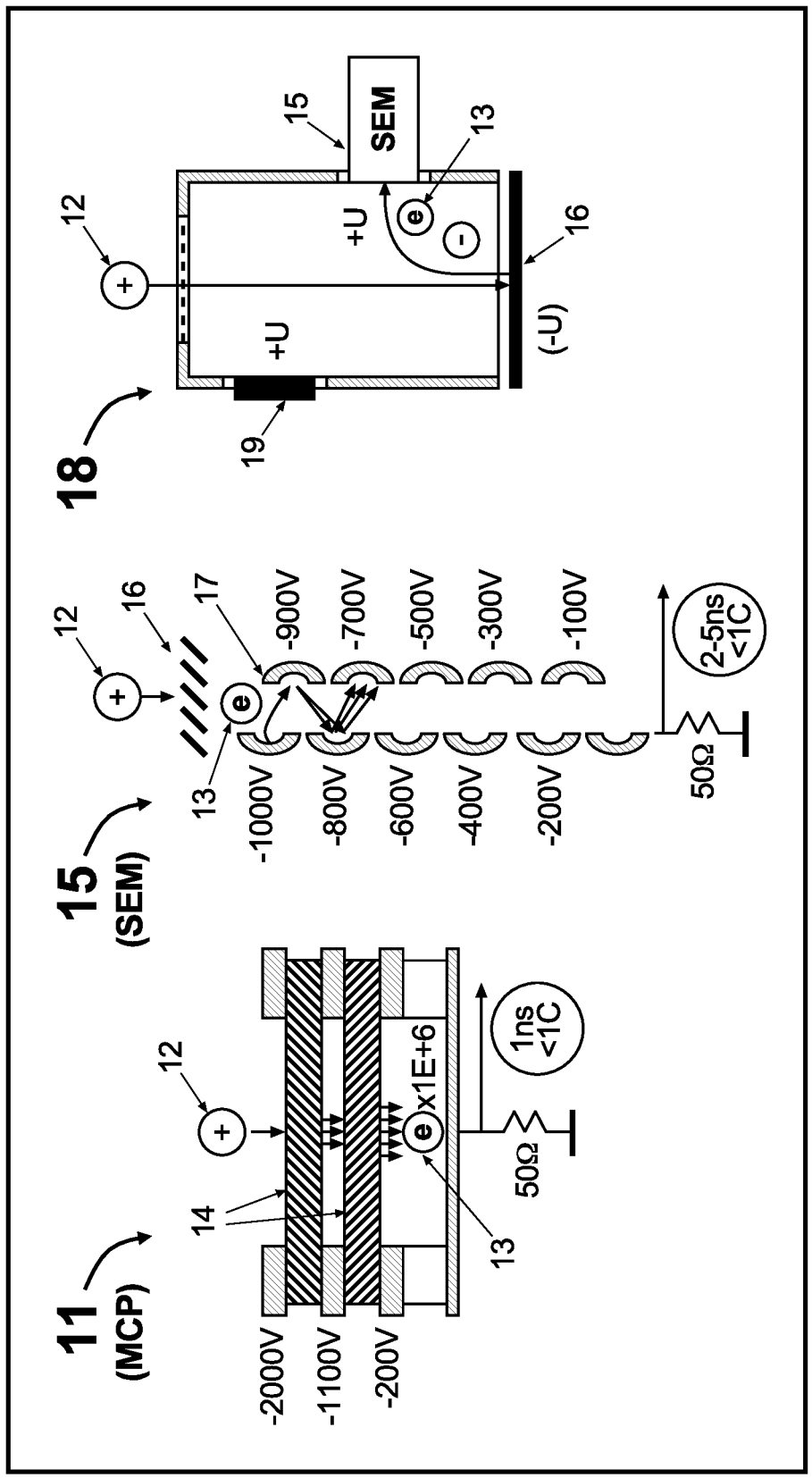
FIG. 1 shows electron amplifiers.

Referring to FIG. 1, TOF detectors are shown based either on microchannel plates 14 (MCP) or discrete dynodes 17 for electron amplification. Ion packets 12 hit the MCP 14 or a surface of a converter 16 and emit secondary electrons 13. Secondary electrons are accelerated towards the next discrete dynode 17 or within the resistive channel of MCP 14, which both amplify electron avalanche in cascades of electron-to-electron conversion. For specially developed surfaces (usually containing oxides) with strongly enhanced work function, the electron avalanche doubles per each 50V-100V acceleration.

A chevron dual MCP 11 is characterized by: gain 1E+6 to detect individual ions, saturation at about 1E+7 ions/cm$^2$/sec (which limits the dynamic range); and less than one Coulomb (1 C) life time, measured at the second MCP output. At 1E+7 ion/sec flux and 1E+6 gain, the output flux is 1E+13 electrons/sec (at 1 μA) and the life time is 1E+6 seconds, or about 2 weeks (Notably, a 3E+7-second life time equals approximately one year). Thus, detector life time presents a significantly limiting factor.

Secondary electron multipliers (SEM) 15 usually comprise either multiple discrete dynodes 17 or meshes or dynode arrays with high voltage being distributed by a resistive divider. The dynodes 17 are coated by an oxide active surface for reduced work function, enhancing electron amplification. However, when placed in a technical vacuum (occurring in TOF MS when SEM is not sealed), those active surfaces contaminate and deplete oxides, thus reducing life time to under one Coulomb (1 C). Discrete dynode SEM are poorly suited for TOF MS because of the large time-of-flight spread of the arriving ions packets 12 at first dynode 16, which commonly has a shape of a venetian blind.

To reduce ion time distortions, ETP Corporation has proposed a specialized ion-to-electron converter 18. Symmetric application of a positive bias (onto SEM 15 and compensating electrode 19) reduces TOF effect of the impinging ion packets. Secondary electrons 13 are sampled by electrostatic field into SEM 15. However, small negative ions (for example, H$^-$, CHn$^-$) also reach SEM 15 and generate bogus peaks at 0.1-1% of the main peak intensity. Additionally, such converter 18 is position-sensitive with small-sized sweet spot. The converter 18 does not solve the main problem of prior art TOF detectors (i.e. small dynamic range and short life time).

Figure 2:
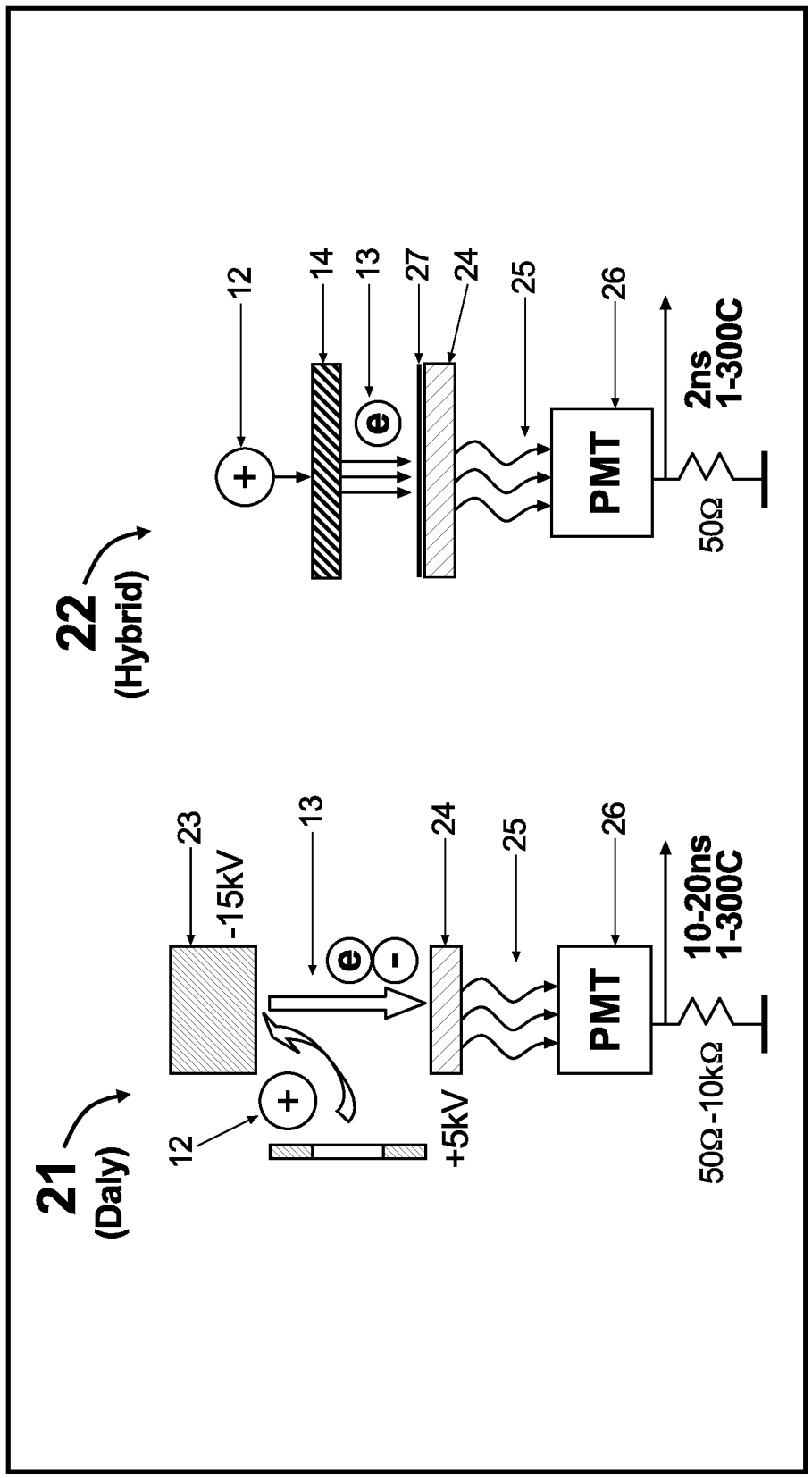
FIG. 2 shows ion detectors with photo conversion.

Referring to FIG. 2, existing detectors with photo-conversion are shown as an exemplar Daly detector 21 and hybrid TOF detector 22. The Daly detector 21 has been designed for recording continuous ion beams and is primarily addresses the efficiency problems associated with TOF detection. However, the Daly detector 21 experiences a slow time response due to curved ion sampling and the formation of secondary electrons 13 from the conversion surface 23.

Hybrid detectors 22, like one developed by Photonics Corp, US, appear almost appropriate for MR-TOF instrumentation. They use a single MCP 14 for rapid ion-to-electron conversion, fast scintillators 24, and an optional PMT 26 with an extended life time. However, the MCP stage 14 may limit both dynamic range and life time. Amplification of the electron avalanche by the MCP 14 strongly reduces the life time of the scintillator 24. A micron-range metal coating partially stops secondary electrons 13 at the scintillator 24 and can be destroyed by ions, such as ions formed by electron ionization of the residual gas in the gap between the MCP 14 and the scintillator 24. Finally, poor photon coupling requires strong MCP amplification, further aggregating the above negative effects. The life time of the detector 22 may be estimated to be as low as under ten Coulomb.

Figure 3:
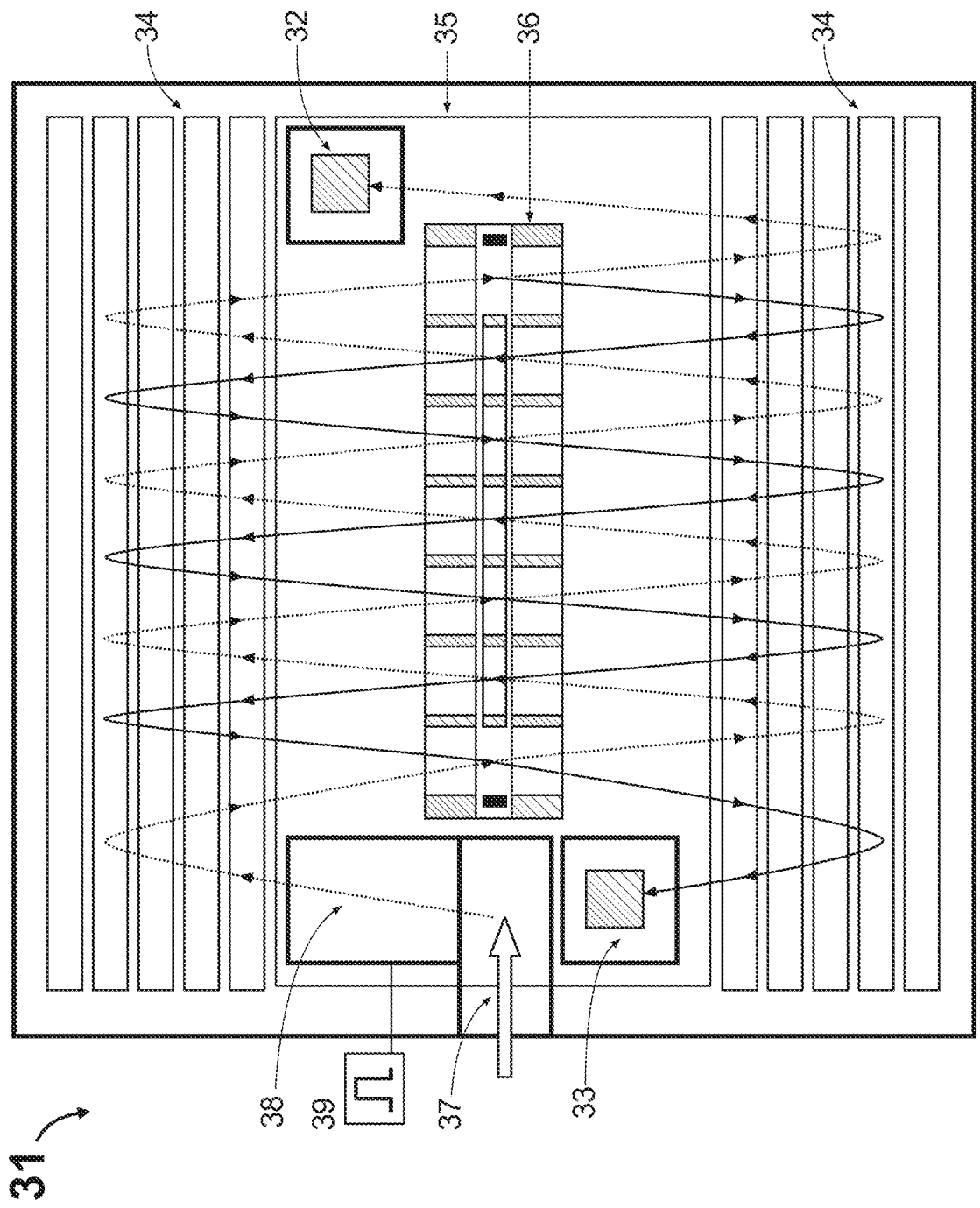
FIG. 3 shows an MR-TOF analyzer.

Referring to FIG. 3, the disadvantages aggregate when using a hybrid detector 22 in multi-reflecting (MR-TOF) analyzers having limited space gap for placing the detector in the position 32, 33.

The MR-TOF MS 31 is designed for substantial enhancing of TOF resolution by extending the ion flight path. The extended jig-saw flight path is arranged between a pair of gridless ion mirrors 34, separated by a floated drift space 35. To avoid ionic losses, ions are spatially focused by periodic lenses 36, as described in WO2005001878 (which is incorporated herein by reference). By applying high voltage pulses 39, an orthogonal accelerator 38 converts a continuous ion beam 37 into pulsed packets, moving along the shown jig saw trajectory. To further extend the flight path, the trajectory is reverted by the end deflector (shown by black color), so that ion packets move towards the detector in the position 33 (along a reverted jig saw trajectory illustrated by the solid line). The detector appears in the congested space 33. In addition, detector appears close to the orthogonal accelerator 38 and is susceptible to pick up of high voltage pulses 39. Even in MR-TOF MS without an end deflector (and, therefore, the ion trajectory is not reverted), the detector would be included at position 32, which is also a congested location.

Additionally, certain optional methods of frequent encoded pulsing may increase ion fluxes in MR-TOF as much as 50-100 times, described in WO2011135477, WO2013192161, and WO2013067366 (each incorporated herein by reference) or as much as up to 1E+8 ions/sec, as described in a co-pending application by the present inventors (also incorporated herein by reference). Further, the flux may reach up to 1E+9 ions/sec when using electron impact ion sources for GC-MS analyses. Existing TOF detectors fail to satisfy multiple conditions for these fluxes. For example, they have a very limited dynamic range. And they have too short of a life time. Also, they require large amounts of space, but much space within MR-TOF MS is currently occupied by the orthogonal accelerator 38 and periodic lens 36.

Detector Embodiment

To alleviate the above described problems, the detector's dynamic range and life time have been enhanced and adopted for a multi-reflecting TOF MS (MR-TOF MS) in the following novel combination.

Figure 4:
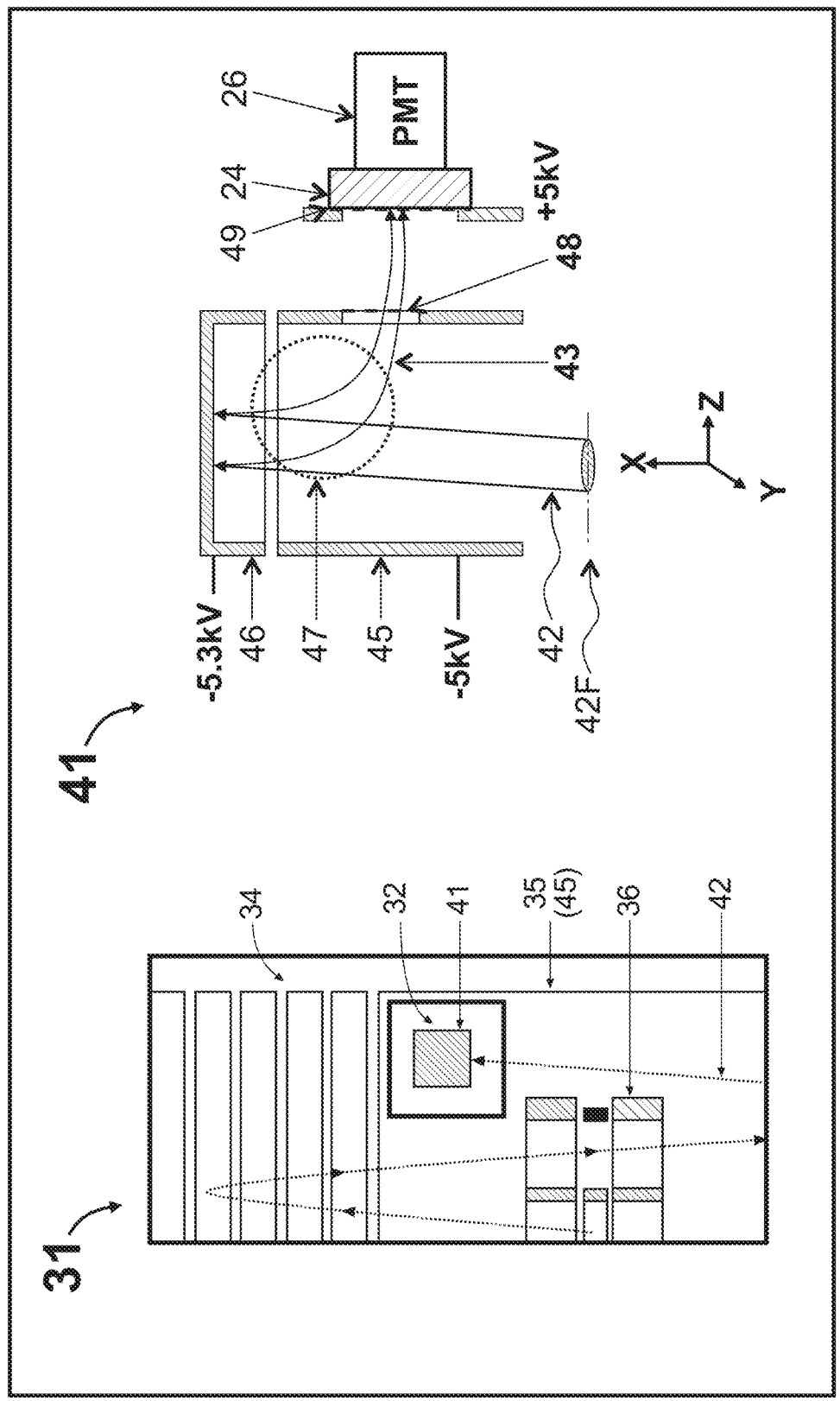
FIG. 4 shows an embodiment of a TOF detector of this disclosure.

Referring to FIG. 4, there is presented a zoom view of FIG. 3 showing a feasible detector position 32 within the MR-TOF MS 31 at which the detector 41 may reside. In one embodiment 41 of the present invention, the improved time-of-flight detector 41 includes: a conductive converter 46 facing an ion beam 42 and placed adjacent to a drift space 45 of the MR-TOF MS 31; a mesh-coated side window 48 within the drift space 45; magnets 47 oriented orthogonal to the window 48 position; an organic fast scintillator 24 coated or covered by a conductive mesh 4; and a photomultiplier 26 with an extended life time and fast time response. In a sense, the detector 41 is similar to the wide spread the Daly detector 21 of FIG. 2, except the detector 41 of FIG. 4 includes an improved converter 46 for reducing time-of-flight distortions and for avoiding detection of secondary negative ions.

In operation, following MR-TOF coordinate annotation, the converter 46 is installed in a Y-Z plane, normal to an X-axis of the MR-TOF MS 31 and parallel to the time front 42F of impinging ion packets 42. The converter 46 is floated negative by several hundred volts relative to the analyzer drift space 45 (here, 300V potential difference and −5 kV drift potential). Ions hit the converter 46 with an energy level at 5-6 keV energy (accounting acceleration in the pulsed source), and secondary electrons 43 are emitted, with close to unity ion-to-electron efficiency for small molecules (i.e. molecules typically under 500 amu in GC-MS). Emitted secondary electrons 43 are accelerated by the 300V difference between converter 46 and the drift space 45 while being steered by a magnetic field of the magnets 47 as shown by the secondary electron trajectories 43. Magnets 47 are installed to form magnetic lines substantially along an Y-axis to steer emitted secondary electrons 43 in a Z-direction. The voltage bias of the converter 46 is adjusted relative to the strength of the magnetic field (which is typically chosen between 30 to 300 Gauss) to provide for secondary electron 43 focusing onto the scintillator 24. The axis of the magnet 47 is preferably shifted from the axis of the ion beam 42 to provide an additional Y-directional electron confinement (accounting curvature of magnetic lines), while 90 degree magnetic steering provides natural X-directional electron confinement. Secondary electrons 43 are sampled through a mesh covered window 48 and are accelerated to the positively biased scintillator 24. Higher biasing (up to +10 kV) is preferred for higher signal gain, but may be limited for practical reasons (for example, by the available space and insulation). The scintillator 24 is a fast organic scintillator (for example, the BC418 or the BC422Q by St. Gobain Corporation) having high electron-to-photon efficiency—i.e. at least 1 photon per every 130 keV of electron energy (for the BC418) or at least 1 photon per every 400 eV of electron energy (for BC418Q). Thus, a single secondary electron at 10-15 kV energy forms at least 25 photons. This allows reliable detection of almost every primary ion, in spite of limited efficiency of photon collection (estimated in our experiments as limited as at 20%) and in spite of a limited photon efficiency (25-30%) of the photo-emitter in the PMT 26.

In an embodiment, the detector 41 is capable of detecting individual ions at a high (estimated at 70-80%) efficiency without use of any additional amplification stage. As described further hereinafter, avoiding the use of an MCP or any other amplification strongly improves both the dynamic range and life time of the novel TOF detector.

PMT Life Time and Dynamic Range

There are commercially available PMT amplifiers (for example, R9880U by Hamamatsu) which have an extended life time 300 Coulomb, measured by the output charge, while providing sufficiently short (0.57 ns) rise time. The PMT life time of 2,000 hours (1 year working time) may be achieved at an overall detector gain of 1E+6 and an average ion flux of 2E+8 ions/second (30 pA input and 30 µA output average current). This is several times lower than the maximal loads of a GC-MR-TOF mass spectrometer with frequent encoded pulsing. Thus, it is practically advantageous to couple a scintillator via a glass (quartz) window, to mount a PMT on its atmospheric side, and to have an option of PMT replacement. External PMT mounting may be further useful for an improved PMT cooling and electromagnetic shielding.

The detector's linear range (normally limited by output current to 100 µA by a standard resistive divider) can be improved. For example, the last few stages are proposed to be fed by a more powerful supply (with at least several mA current) and being controlled by an active circuit. To enhance the dynamic range of the detector, the last PMT stages are connected to buffer capacitors. However, such improvements may be insufficient for handling temporal peak signals. Further enhancement of the detector dynamic range is proposed by: (a) alternating a gain of the MR-TOF between source pulses; (b) alternating either an electron collection efficiency or a PMT gain between source shots; (c) using a dual PMT with different efficiency of light collection; and (d) taking signals from different PMT dynode stages; and (e) using preamplifiers with dual (triple) gain outputs.

Limits of Other Detector Components

Bare metal converter 46 is not covered by any specially engineered oxide or a material with low work function. It is bombarded and cleaned by high energy ions, and is expected to have infinitive life time. Our own experiments have not indicated any degradation of stainless steel converter at 1 mC ion dose, corresponding to 1000 C PMT output charge. Thus, the converter is not a bottleneck.

Conventional hybrid TOF detectors 22 (like one by Photonics) may employ an additional microchannel (MCP) stage 14 in-front of the scintillator 24 in order to enhance the overall signal gain and may also employ thin (1 µm) aluminum coating on top of scintillators 24 to prevent scintillator charging and to enhance photon collection. Those two features strongly limit both the life time and the dynamic range of the detector 22. The embodiment 41 alleviates those problems. Omitting an MCP stage avoids the problem of MCP saturation (known to occur at 1E+7 ions/sec/cm$^2$ flux density). Omitting the MCP stage also substantially (i.e. 100-1000 fold) reduces the electron dose onto scintillator 24. Based on testing of the hybrid detector 22, surviving 10 C output charge, the same scintillator 24 installed within the novel detector 41 would survive for 1000-10,000 C of the PMT output charge. The scintillator safe dose could be also estimated assuming organics depletion by the bombarding electrons. Assuming a 10 kV electron energy, an electron penetration depth of 10 µm, an organic molecule volume of 30 A$^2$, and destruction of one molecule per 100 eV electron energy, then a 1 cm$^2$ surface layer of the scintillator 24 may stand a dose of approximately 3E+16 electrons, corresponding to 3E+22e PMT output, i.e. 2000 C. This estimate also confirms that PMT life time (300 C) is more likely to be the bottleneck rather than the scintillator life time.

Additionally, scintillators 24 live longer than the metal (aluminum) micron coating. Besides, partially destroyed coating causes poorly controlled energy loss of secondary electrons and sweet spots on the hybrid detector 22. The embodiment 41 omits the aluminum coating. Instead, a deposited or covering thick metal mesh 49 appears sufficient to provide electrostatic removal of the electron charge by surface discharges and leaks at 1 kV/mm for a cell size of the conductive mesh between 0.3-1 mm.

No processes on the converter 46 or scintillator 24 appear to limit the dynamic range of the detector 41. Thus, it is the PMT 26 which is the bottleneck for both the dynamic range and life time of the detector 41.

Optimization of Converter Efficiency

In an implementation, the proposed detector 41 is substantially optimized for high efficiency of ion-to-electron conversion, electron collection, electron-to-photon conversion, and photon collection. Without this optimization, the MCP omission would reduce the ion detection probability and would not be suitable for detecting individual ions.

The ion-to-electron conversion efficiency for a stainless steel converter 46 was determined via direct measurements of electric current on the converter plate 46, on the drift space electrode 45, and on the scintillator 24. Water ions (18Th) at 5 keV ion kinetic energy produce more than 6 electrons/ion. Since the efficiency of kinetic electron emission is proportional to ion velocity, the conversion efficiency remains above 1 electron/ion for 5 keV ions of a mass below 650Th.

Figure 5:
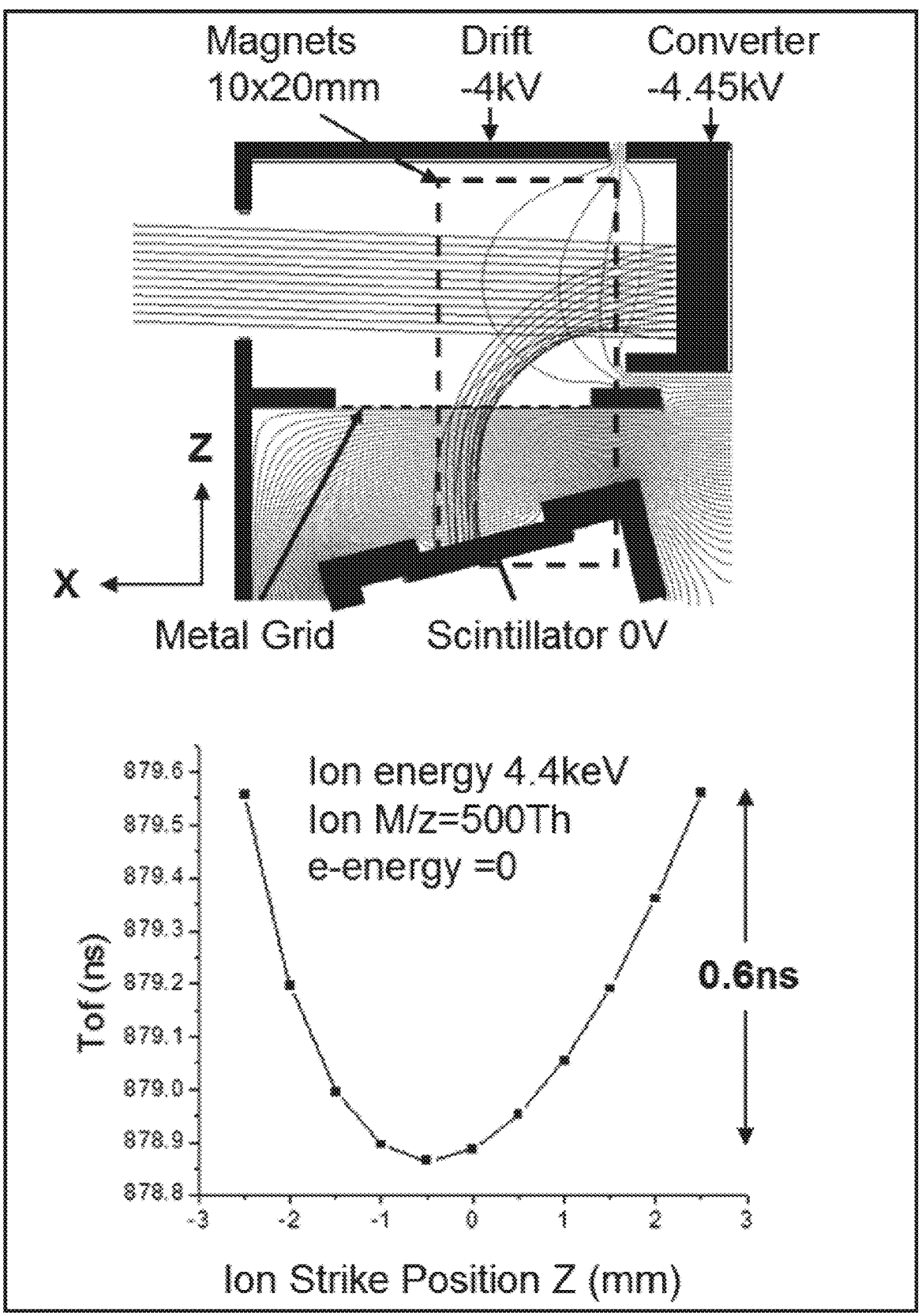
FIG. 5 presents the Z-aberration of the detector of FIG. 4.
Figure 6:
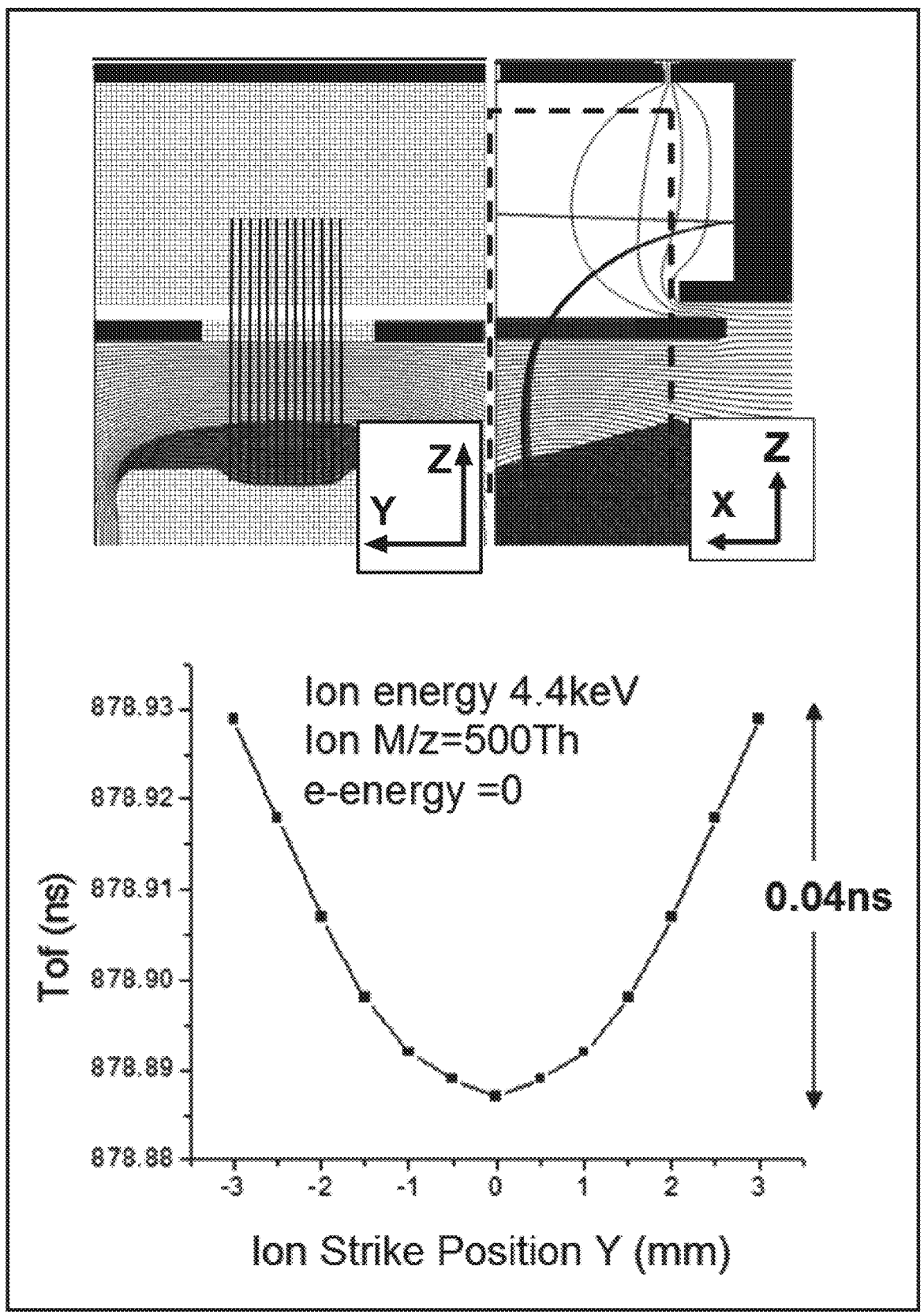
FIG. 6 presents the Y-aberration of the detector of FIG. 4.
Figure 7:
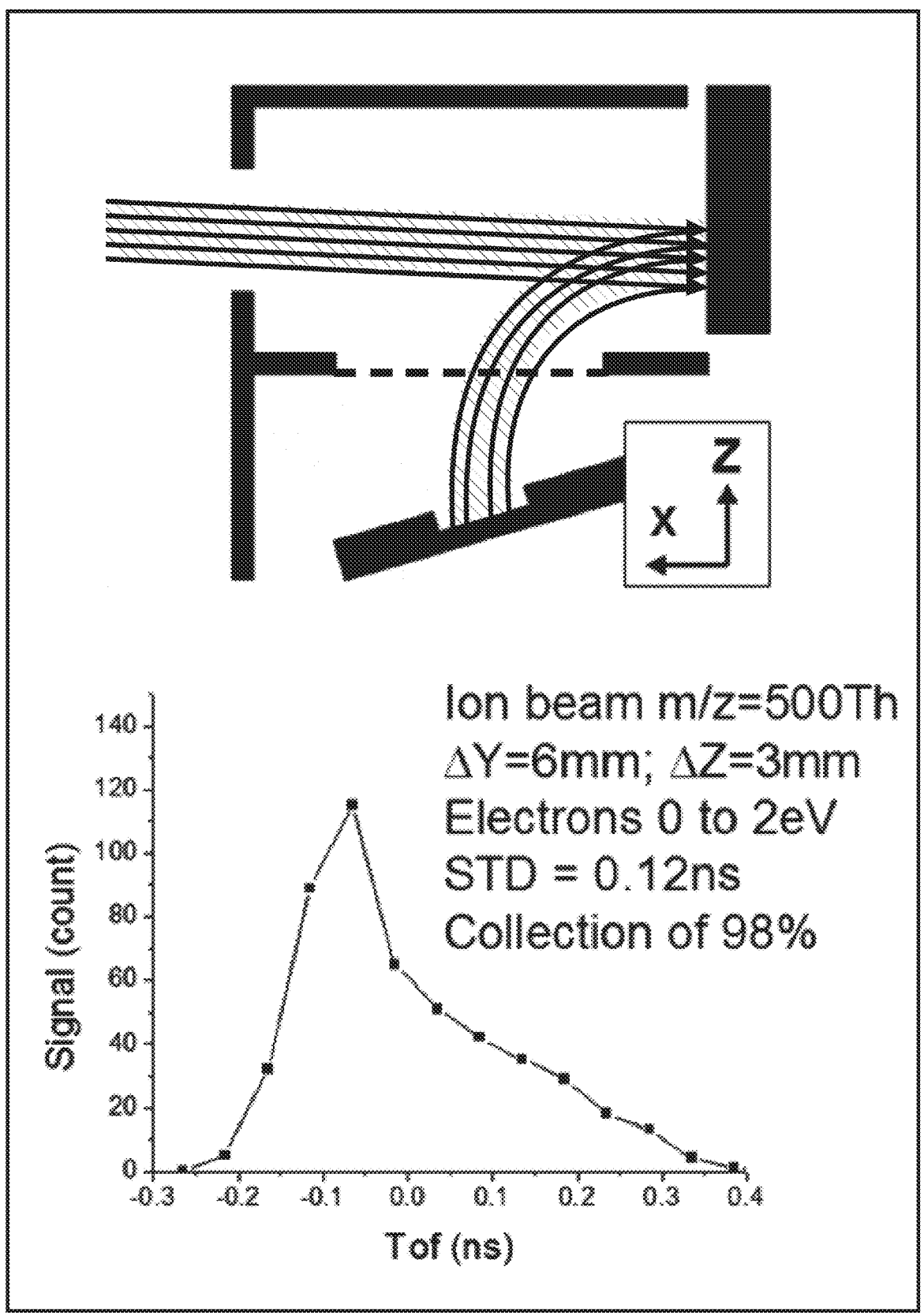
FIG. 7 presents the peak shape due to ion/electron aberrations of the detector of FIG. 4.

Referring to FIG. 5-FIG. 7, a SIMION model confirms about 100% collection efficiency of secondary electrons, emitted from the converter plate 46. Parameters of the converter 46 were optimized for both transmission and time spreads: drift potential=−4000V; converter potential=−4450V; scintillator potential=0V; ion energy=4400 eV; ion mass=500Th. A scintillator surface of 8 mm in diameter is exposed to the beam of secondary electrons. A non-uniform magnetic field is formed by two rectangular magnets (25× 10×3 mm) spaced 60 mm apart in the Y-direction. Magnetic field strength is 55 Gauss at the center of the converter. The shape of the converter plate 46 forms a lens to focus electrons in an X-Z plane while keeping time aberration at a sub-nanosecond level. The simulated ion beam is 3 mm wide in the Z-direction and 6 mm wide in the Y-direction, corresponding to normal parameters of ion packets in MR-TOF MS. For 500Th ions the Z-aberration is below 0.2 ns (FIG. 5) and Y-aberration is below 0.04 ns (FIG. 6). Optionally, the converter surface may be shaped to compensate for spherical Z-aberrations.

Referring to FIG. 7, for 500Th and 3 mm-by-6 mm ion packets and a 0-2 eV uniform initial electron energy distribution, the simulated base peak width is only 0.6 ns and the electron collection efficiency is 98%. Thus, in spite of the 90-degree ion steering, the proposed magnetic converter provides for effective electron collection and sufficiently low sub-nanosecond time distortions.

Figure 8:
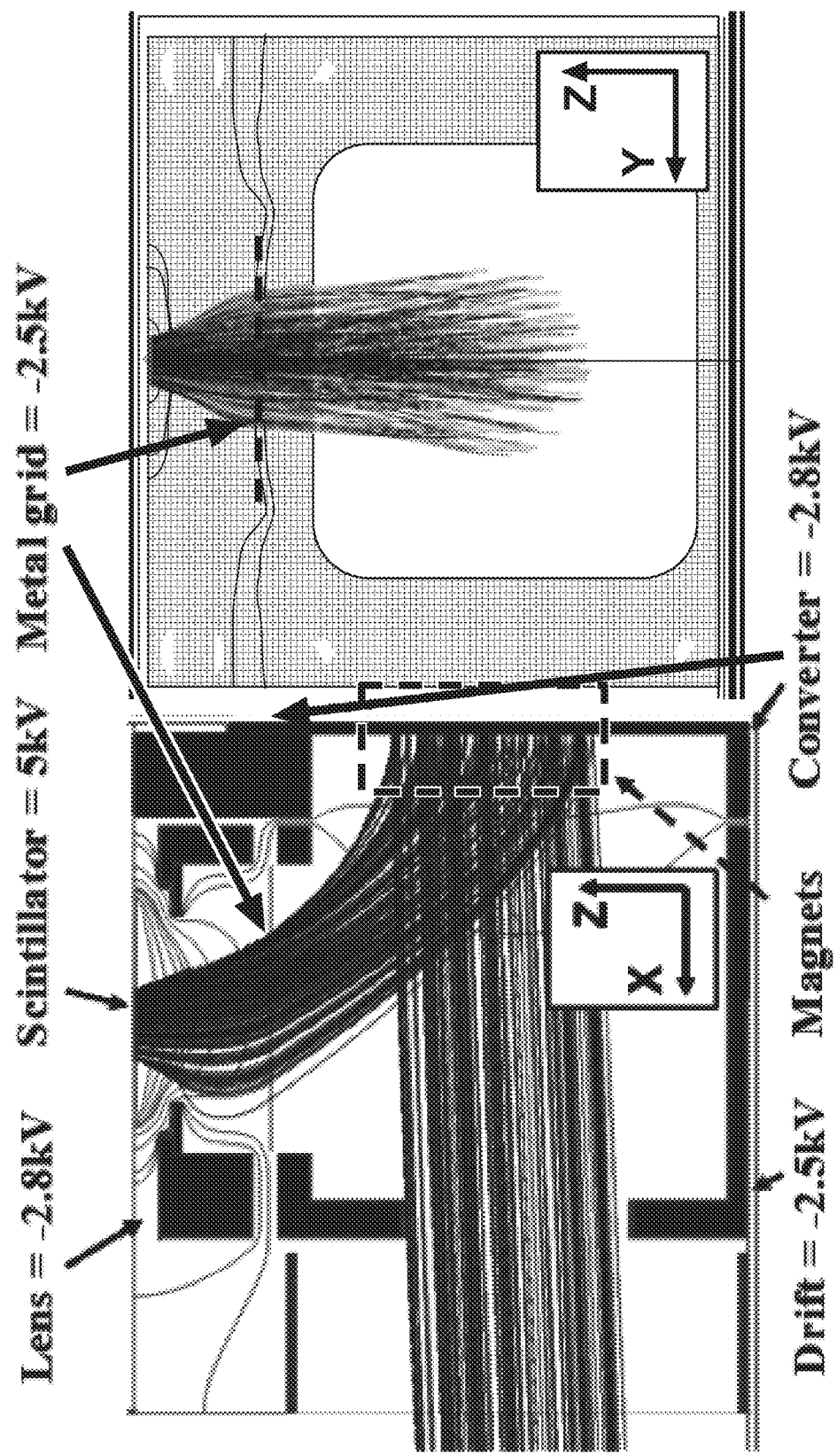
FIG. 8 presents non-uniform X-directional magnetic field focusing of an electron beam.

Referring to FIG. 8, yet another example of the proposed detector scheme is suitable for singly reflecting TOF and allows collecting secondary electrons from a wide ion beam. The SIMION model assumes the following parameters: drift potential=−2500V; converter potential=−3100V (FIG. 8) and −2800V (FIG. 9); scintillator potential=5000V; ion energy=3000 eV; ion mass=500Th, entrance aperture diameter=18 mm. Notably, both the electric and the magnetic field are used for secondary electron beam focusing on a scintillator having a diameter of 9 mm. A non-uniform magnetic field is formed by two rectangular magnets (for example, sized at 25 mm-by-10 mm-by-3 mm) spaced 70 mm apart in the Y-direction. Positions of the magnets in the X- and Z-directions are adjusted to achieve a Y-directional focusing effect due to the curvature of the magnetic lines.

Figure 9:
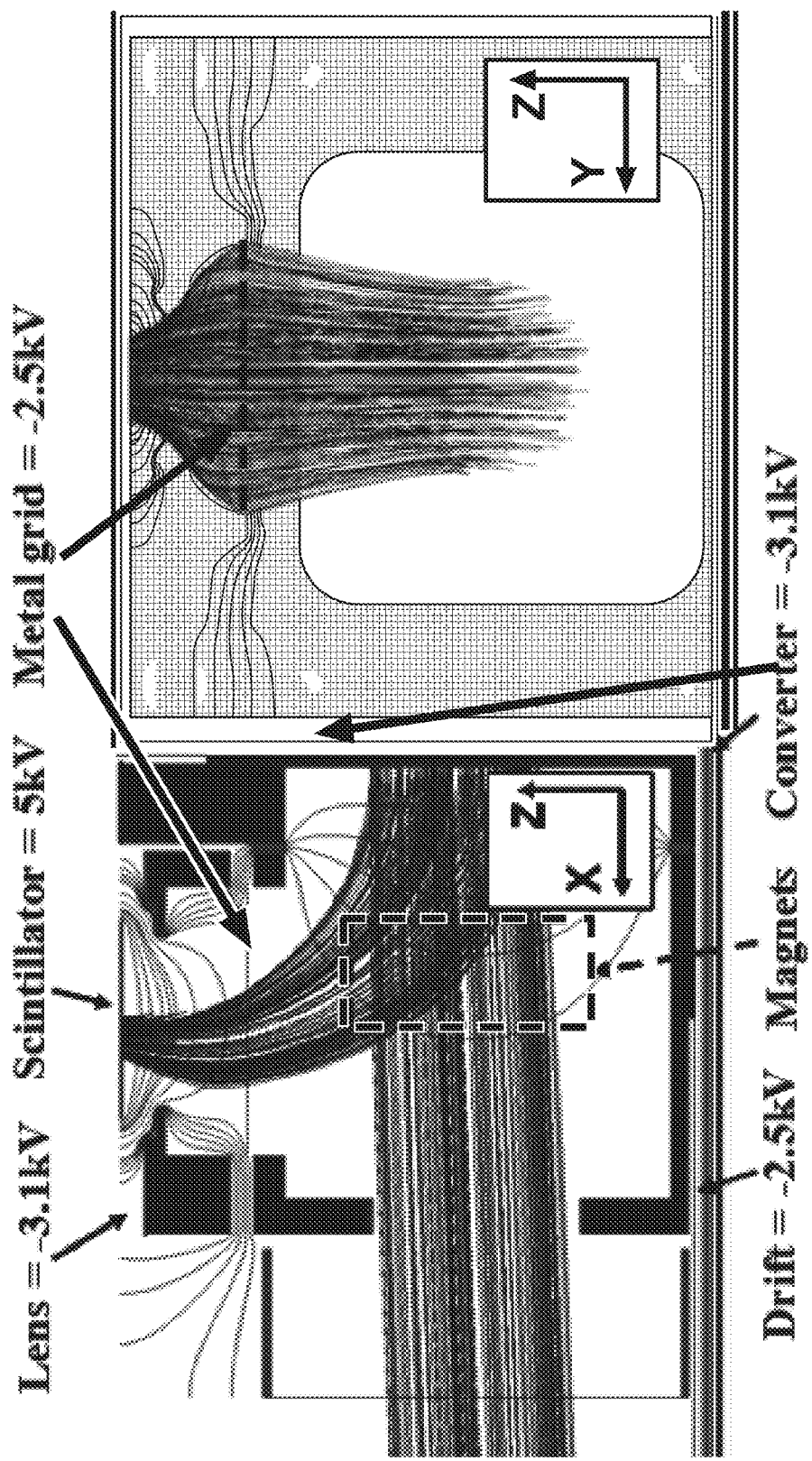
FIG. 9 presents non-uniform X-directional magnetic field defocusing of an electron beam.
Figure 10:
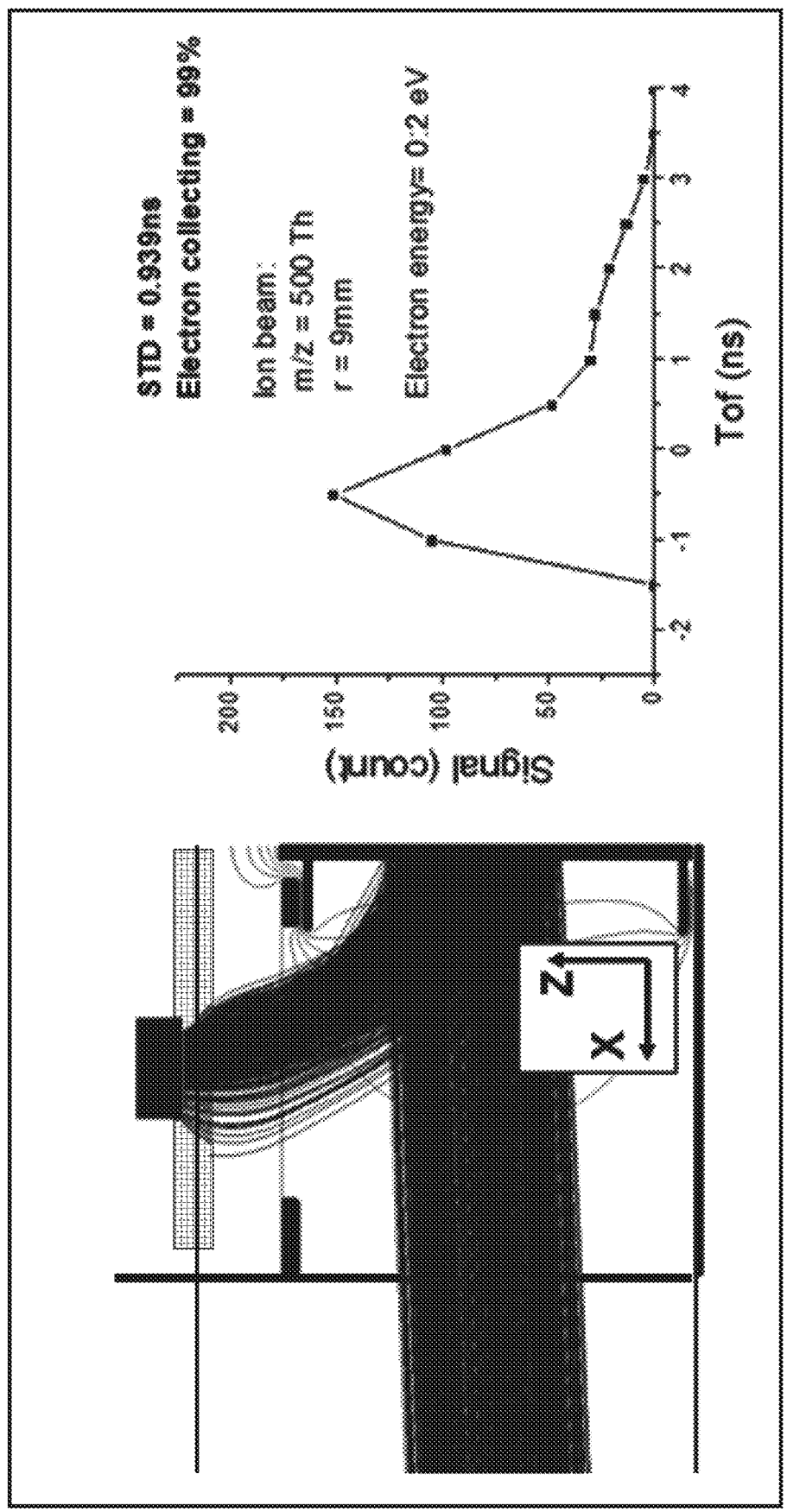
FIG. 10 presents a peak shape due to ion/electron aberrations for an ion beam of 18 mm.

Referring to FIG. 9, if the magnets are shifted from the optimal position, Y-directional electron defocusing occurs and causes additional time aberrations and spatial losses. Referring to FIG. 10, at an optimal magnet position for 500Th and 18 mm ion packets with 0-2 eV uniform initial electron energy distribution, the simulated electron collection efficiency is 98%, the peak FWHM is 2 ns, and the base peak width is 4 ns. These results indicate that this orientation is acceptable for a low resolution singly reflecting TOF MS.

Optimizing Scintillator

As described above, detector 41 employs an organic scintillator 24 in order to combine fast time response and efficient electron detection. Since known organic scintillators 24 are non-conductive, a conductive layer should be included to prevent scintillator-surface charging by the secondary electrons 43.

Figure 11:
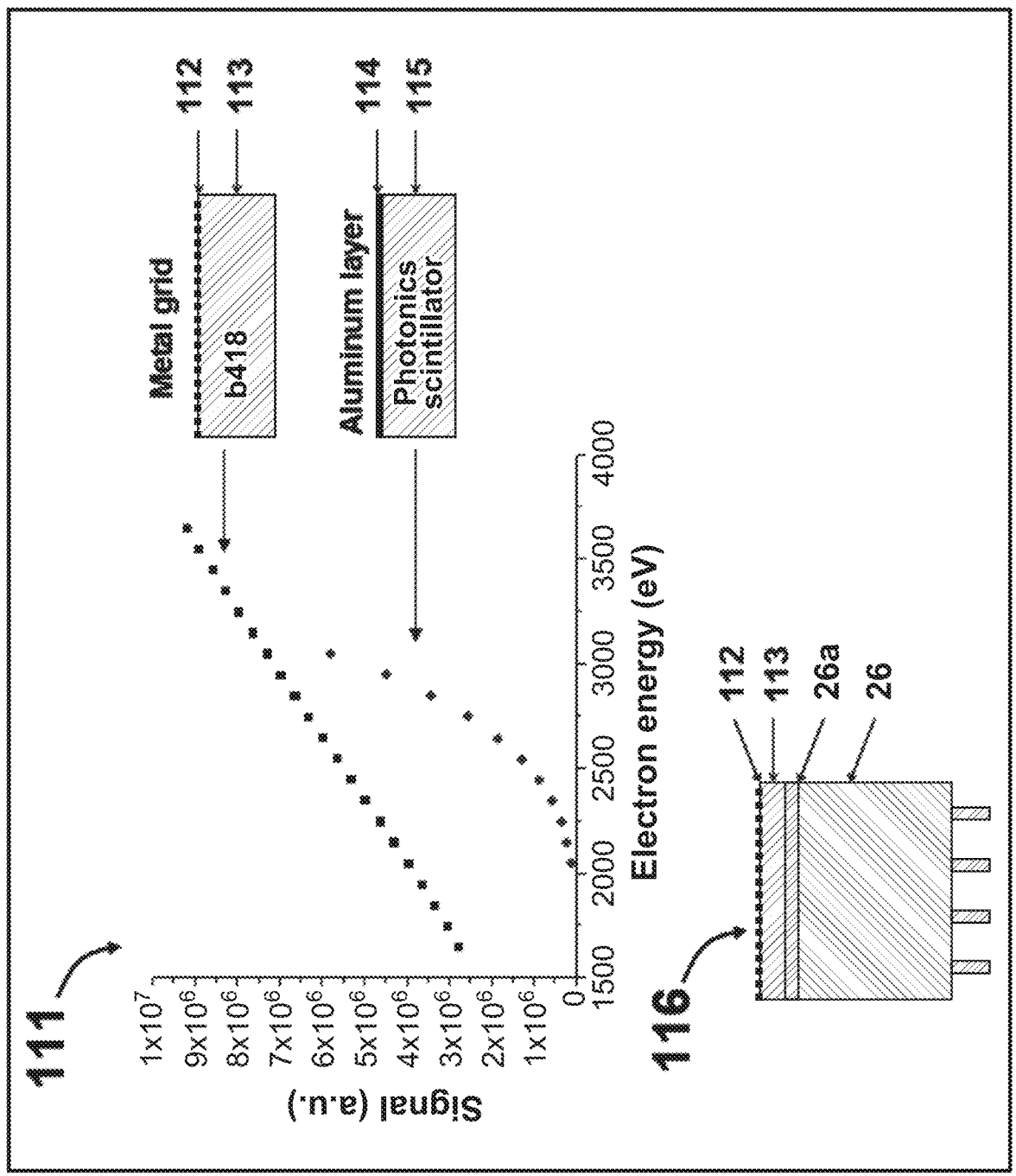
FIG. 11 shows a graph of signal intensity as a function of electron energy for both a scintillator with metalized layer and a scintillator with a metal grid on top.

Referring to FIG. 11, two options are explored: (a) coating of a scintillator 115 with a thin metal layer 114 (as implemented in Photonics detectors); and (b) depositing or covering b418 scintillator 113 surface by a metal grid 112. Graph 111 compares efficiency of electron detection for both options. Electrons lose some kinetic energy while penetrating the metal layer. Thus, the scintillator 115 with the thin metal coating 114 reduces the total number of emitted photons, whereas the photon signal is proportional to the electron energy if a metal grid 112 is used to cover the scintillator 113.

To enhance photon collection, diagram 116 illustrates a scintillator 113 that has been optically coupled by a layer 26a to a PMT 26 window to prevent the total internal reflection of photons from the scintillator surface that is connected to the PMT window. The refractive index of a PVT-based organic scintillator (b418 or b422q) is 1.58, which corresponds to the critical angle (of total internal reflection) of about 40 grad. Thus, in case of polished and parallel scintillator surfaces only 11.5% of photon emitted within the scintillator 113 will be collected on the PMT 26 (23% if a metallization layer is used, since this layer works as a mirror). In a prototype, Fomblin vacuum oil was used as an optical coupler. The optical coupling results in a 4-fold increase in the detector signal.

Detector Efficiency

The efficiency (e.g. the number of detected ions compared to the number of all incoming ions) of the proposed detector 41 is limited by the ion-to-electron conversion efficiency. Indeed, the secondary electron collection on the scintillator 24 is greater than 95%, whereas the electron detection efficiency can be enhanced by increasing the scintillator potential/electron kinetic energy.

Figure 12:
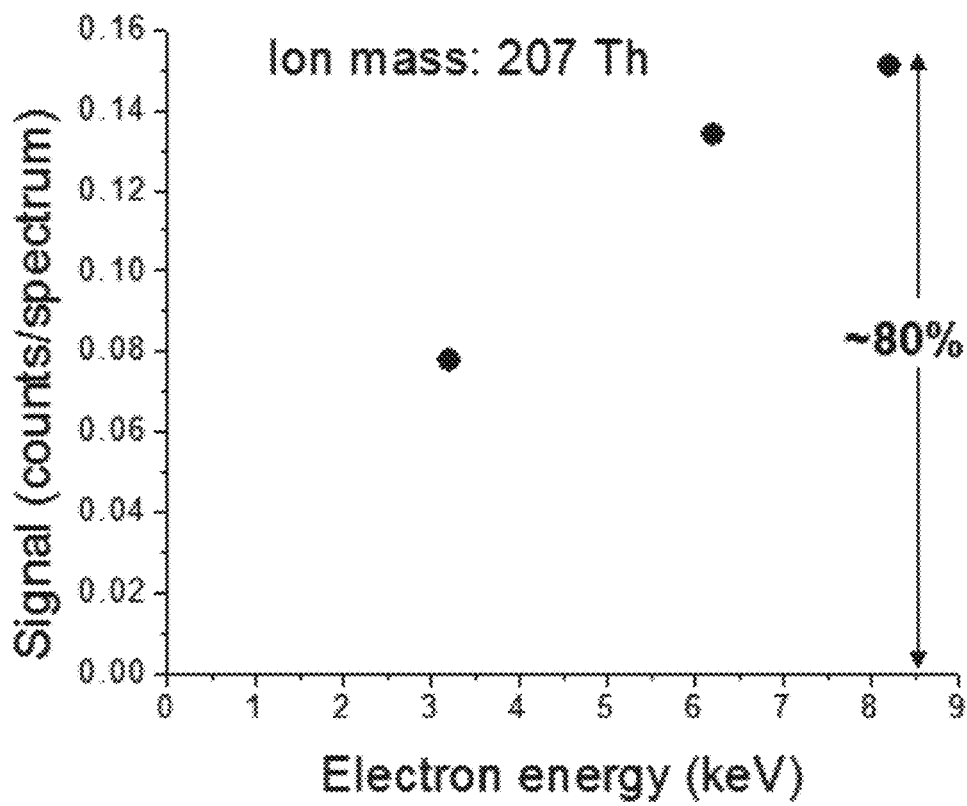
FIG. 12 graphs the signal as a function of electron energy.

Referring to FIG. 12, having a constant ion flux, the increase of the electron energy results in s signal saturation (in counts/spectrum). For a R9880U PMT (by Hamamatsu) optically coupled with a scintillator (b418) using a metal grid as a conductive layer the signal saturation suggests about an 80% secondary electron detection efficiency at an electron energy of 8 keV. Notably, the PMT is operated at 900V to detect every single photon.

Figure 13:
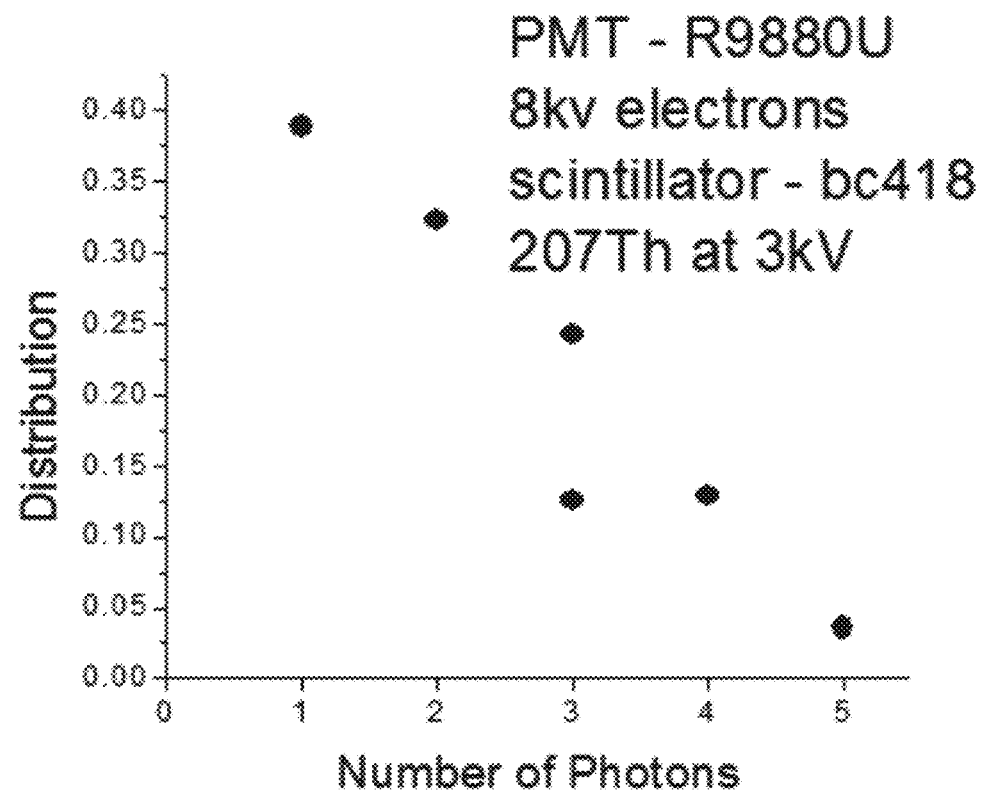
FIG. 13 graphs the distribution of detected photon number per ion.

Referring to FIG. 13, the measured distribution of detected photon number per ion confirms the high detection efficiency described above.

Peak Width

The prototypes of the detector 41 were tested on: electron ionization (EI) reflectron TOF MS; EI orthogonal accelerator (OA) MRTOF 31; and EI OA reflectron TOF MS. Peak width of the detector 41 is determined by the electron-ion optical scheme, rise, and decay time of a scintillator (for b418: 0.5 ns and 1.4 ns; for b422q: 0.11 ns and 0.7 ns), rise and decay time of a PMT (R9880: 0.57 ns and about 0.1 ns for a 50 Om load). Notably, for b418 and b422q, luminescence has a slow component with a decay time of up to 1 ms and with intensity of up to 20%.

Figure 14:
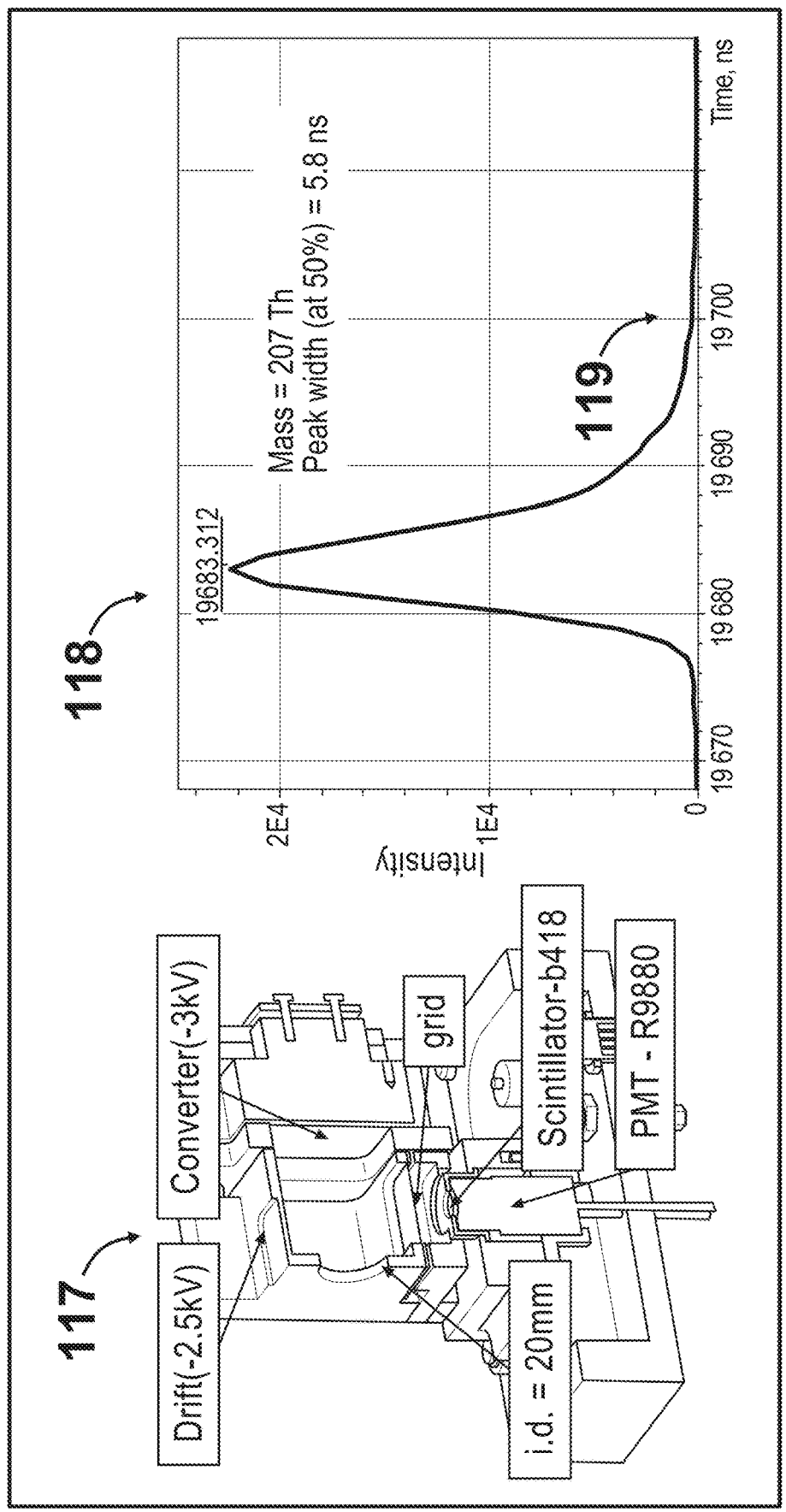
FIG. 14 shows peak shape in a singly reflecting TOF MS for an 18 mm ion beam.

Referring to FIG. 14, a detector 117 is designed for a low resolution reflectron TOF MS. The ion-electron optical properties of the detector 117 are described above. The peak shape 118 of 207Th ion peak has a FWHM width of 5.8 ns, which is limited by a turn-around time for this mass. A slow luminescence tail 119 is observed to be about 20% of the peak intensity.

Figure 15:
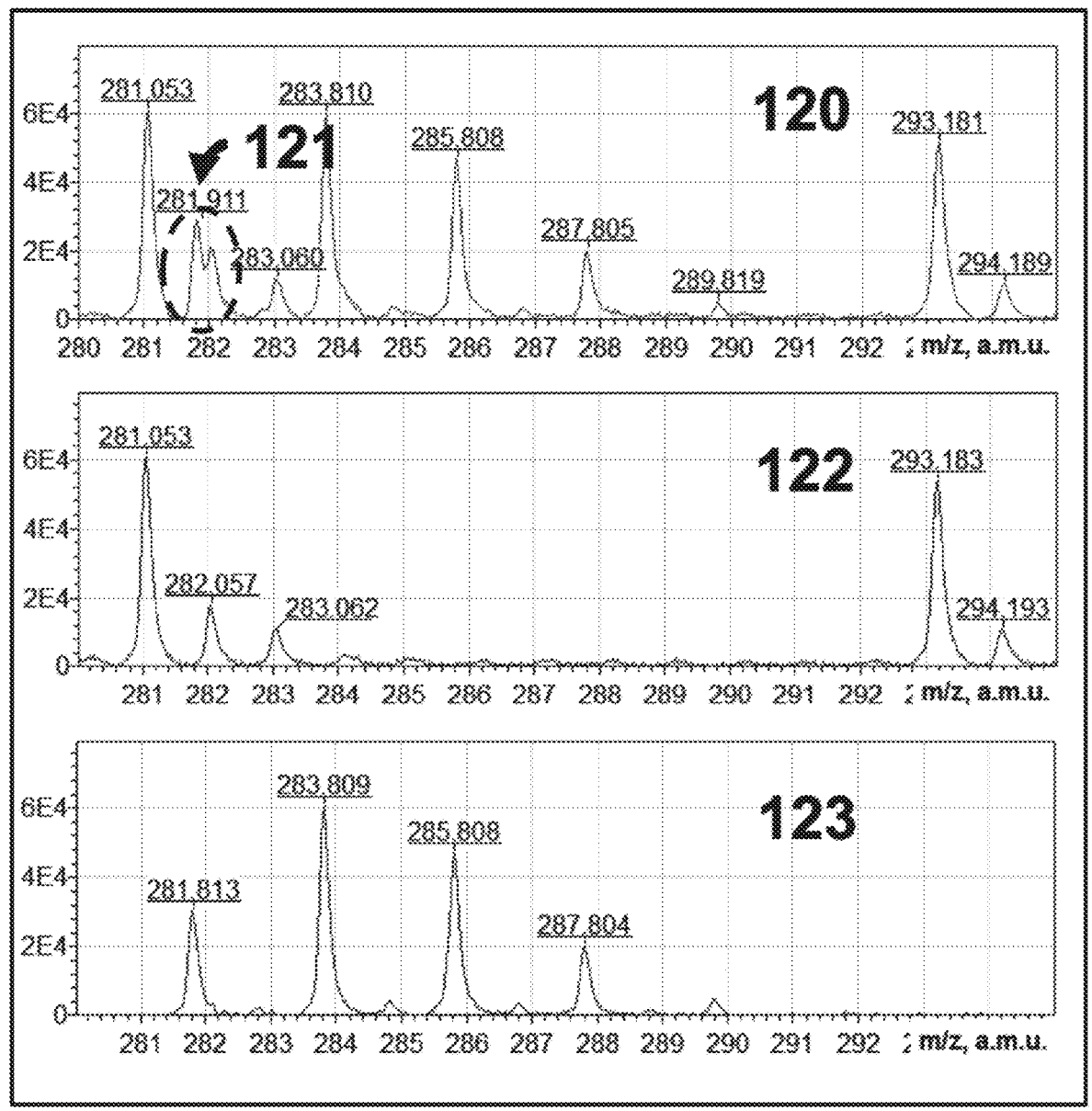
FIG. 15 presents results of de-convolution of a GC peak for an HCB compound.

Referring to FIG. 15, due to the slow luminescence tail 119, in a mass spectrum 120 interfering ion peaks 121 could be observed. In the case of a separation stage in front of the MS (for example: GC, LC, etc.), a de-convolution process allows subtracting chemical background peaks 122 from a mass spectrum 120 to get a mass spectrum of analyte 123. In this example, the chemical background spectrum 122 (1 s) accumulated prior to analyte elution was substituted from the sum spectrum of 1 s hexachlorobenzene (HCB) GC peak in 120. Notably, the de-convolution process preserves the ion peak shape in the analyte spectrum 123 even if there was an interference 121 with a chemical background.

Figure 16:
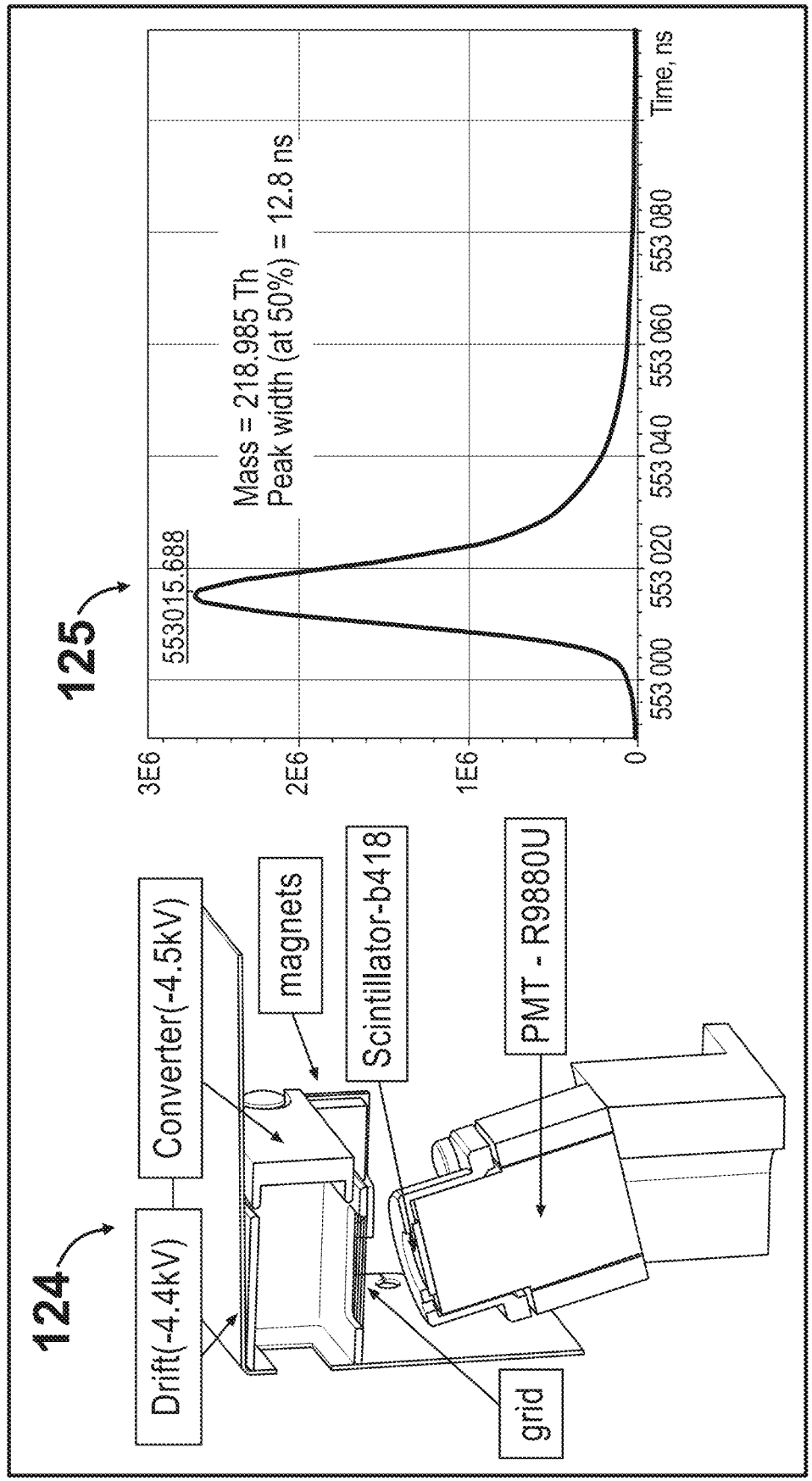
FIG. 16 shows peak shape in an OA MR-TOF MS.

Referring to FIG. 16, a detector 124 is designed for a high resolution MRT MS. The ion-electron optical properties of the detector 124 are described above. A peak shape 125 of 219Th ion peak has a FWHM width of 12.8 ns, which is limited by aberrations in the analyzer and by a turnaround time.

Figure 17:
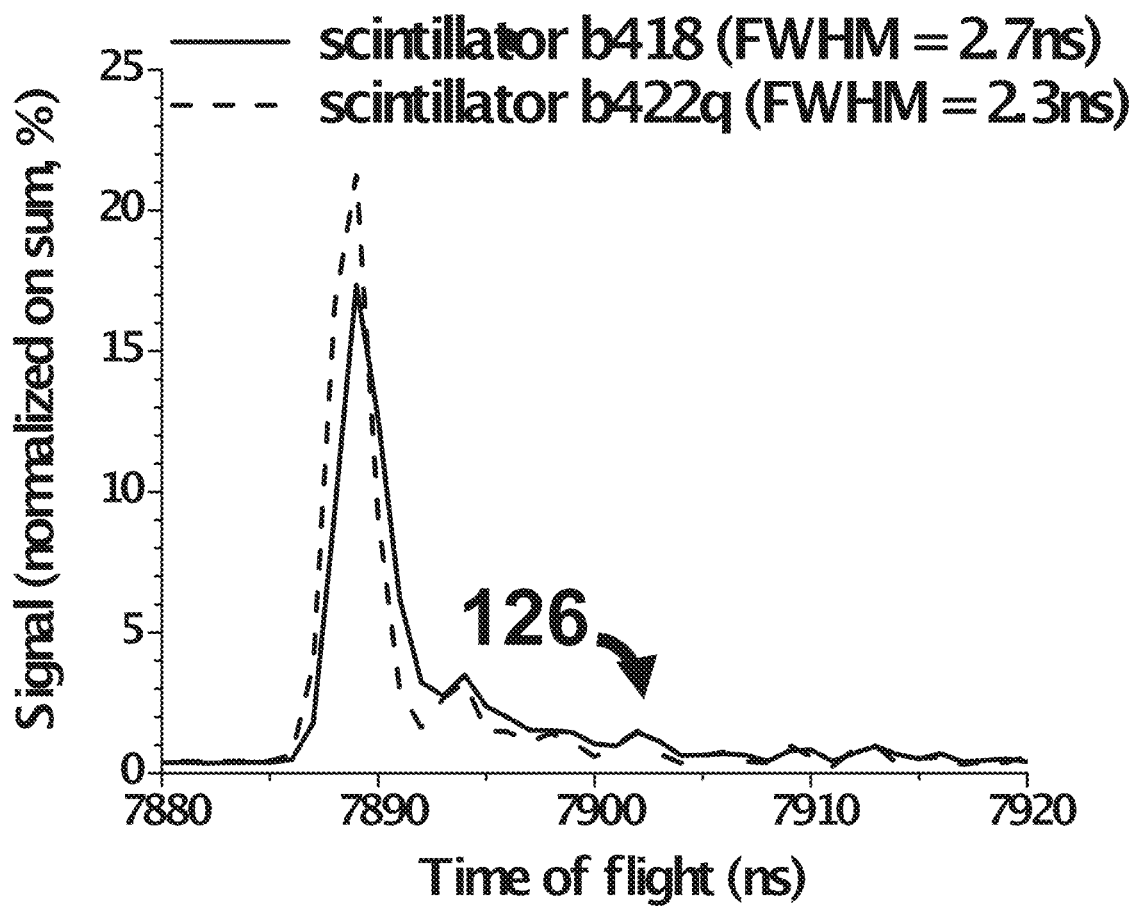
FIG. 17 shows peak shape of 18Th ion peak in a singly reflecting TOF MS with OA.

Referring to FIG. 17, a peak width of 2.7 ns for a mass of 18Th was observed for a variation of the detector 117 tested with an OA TOF MS. Significant reduction of electron/ion optical aberrations occurs when utilizing a detector 117 with a 5 mm-inner-diameter entrance aperture. The tail 126 of the ion peak is due to electric ringing in a detector/preamplifier scheme and due to a slow luminescence. For a mass of 18Th, an ion peak width was determined by both turnaround time and detector respond time. Indeed, implementation including a faster scintillator b422q instead of scintillator b418 reduces a peak width value from 2.7 ns down to 2.3 ns.

Fast Pulsing Method Implementation

Figure 18:
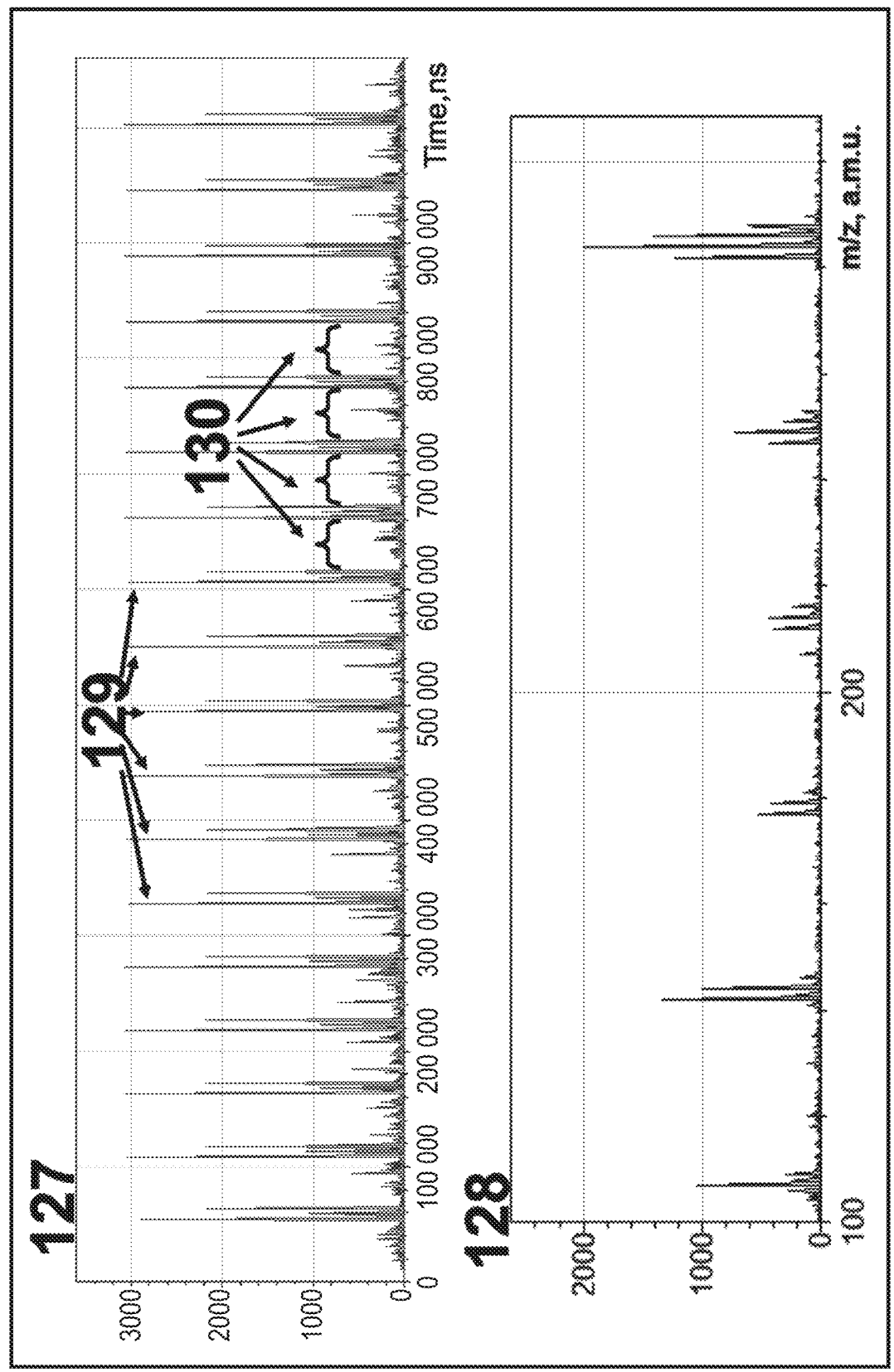
FIG. 18 illustrates a fast pulsing method of a GC EI OA MR-TOF MS.

Referring to FIG. 18, the fast pulsing methods (as described in WO2011135477, WO2013192161, and WO2013067366, each of which are incorporated herein by reference) include a pulsed ion injection into a mass analyzer with an average pulse period much below the average ion time of flight within the mass analyzer. A specific pattern of injection pulses enable a decoding of the resulted mass spectrum 127 (i.e. to correlate ion peaks 130 of mass spectrum 127 with the injection pattern to get a decoded mass spectrum 128). The proximity of the detector to the orthogonal accelerator results in a pick-up of high voltage pulses 129, which are contaminating the acquired mass spectrum 127.

The fast pulsing method was tested on GC EI OA MR-TOF MS that included the prototype detector 124. In general, the decoding process is limited by the peak density in the acquired mass spectrum 127. Notably, a slow luminescence appears in the acquired mass spectrum 127 as single-photon spikes and could not be differentiated from an ion signal. Thus, a slow luminescence increases the peak density. Nevertheless, a slow luminescence observed for the detector 124 doesn't restrict the decoding of the mass spectrum 127 acquired in the fast pulsing method. Notably, decoding of denser spectra (for example, a spectra of a petroleum sample) may require suppression of slow luminescence photons.

Figure 19:
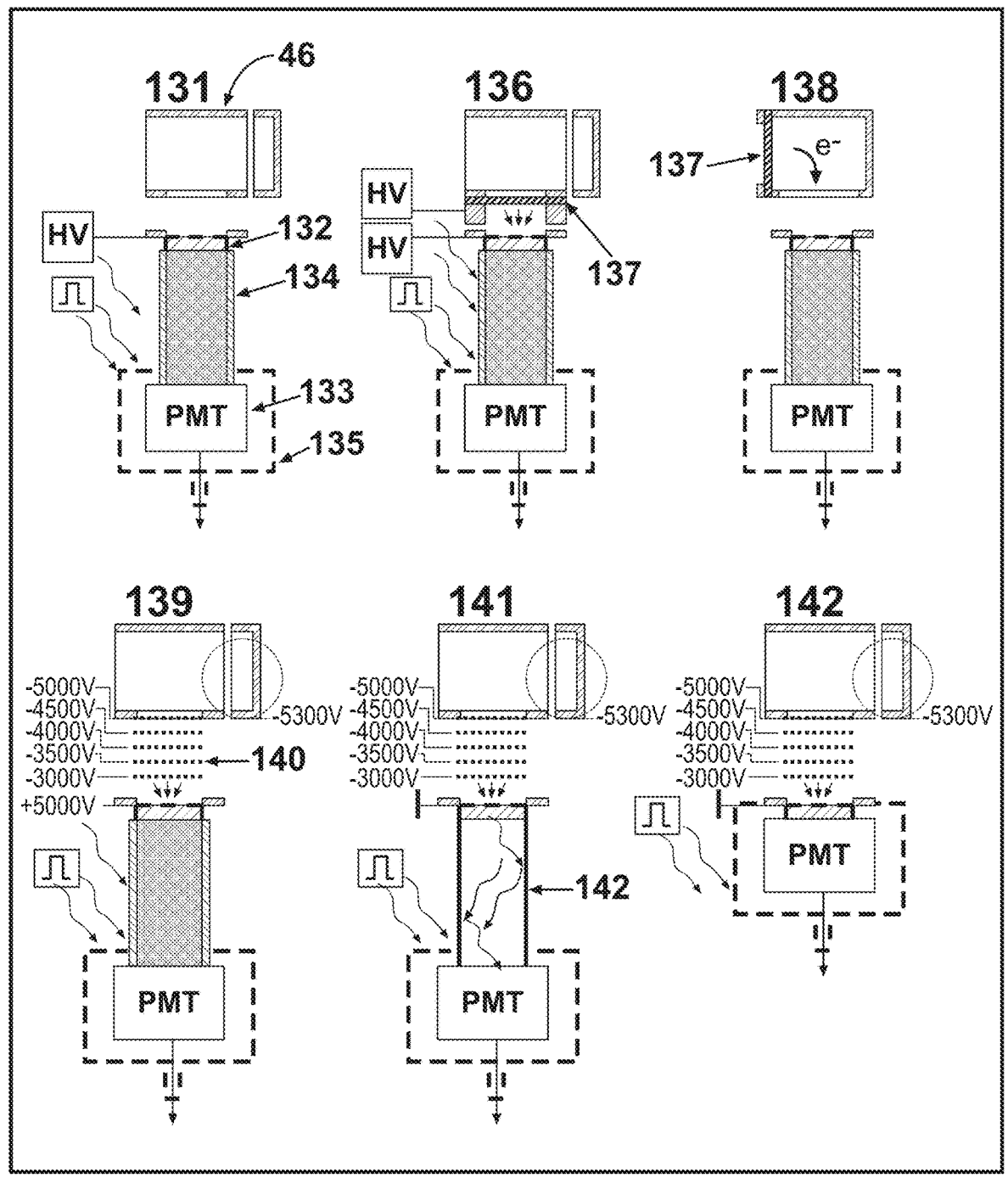
FIG. 19 illustrates schemes of suppressing high voltage pulses pick-up and discriminating slow luminescence photons.

Referring to FIG. 19, further improvements include suppression of high voltage pulses pick-up and discrimination of slow luminescence photons. In a scheme 131, a scintillator 132 is optically connected to a light transmitter 133, which in turn is optically connected with a PMT 134. Optical fiber or optical multi-fiber, a glass cylinder with a metalized surface or metal tube with a polish internal surface 142, or the like could be used as light transmitters 133. Note that a use of a non-conductive light transmitter results in effective isolation of a scintillator 132 from a PMT unit 134. Introduction of light transmitters 133,142 allows organizing electromagnetic shielding 135 of PMT 134 to suppress the pick-up of voltage pulses. Notably, in a scheme 142, the effective shielding is still possible, even in light of size constraints. The light transmitters 133,142 allow for organizing effective photon transfer from a vacuum chamber to an atmospheric side of the detector. Placing the PMT 134 outside of the vacuum chamber results in improved access to the PMT 134, facilitates organization of electromagnetic shielding and allows organizing thermal cooling (to reduce dark current of a PMT). Experiments show that shielding 135 of the PMT 134 with a cupper case outside of the vacuum chamber results in at least a 10-fold decrease of the high voltage pulse induced signal. In a scheme 136, a single MCP plate 137 is introduced between a converter 46 and a scintillator 132. The MCP plate 137 provides an additional amplification stage of providing approximately a 100-fold amplification, which results in an increase to a signal of a single ion compared with a signal of a single photon. Setting an appropriate detection threshold on a data acquisition system enables a discrimination of individual photons having a slow luminescence. In a scheme 138, MCP is placed in front of the detector entrance to convert an ion beam to an electron beam with a 100-fold amplification. The formed electrons are focused on a scintillator 132 using an electrostatic field. This scheme 138 also enables a discrimination of individual slow luminescence photons (similarly to the scheme 136).

Schemes 139,141 and 142, to overcome MCP saturation and limited life time, use a mesh-based secondary electron multiplier (SEM) 140 in technical vacuum. This SEM is based on a plain steel mesh or discrete stainless steel dynodes having 200V-500V per stage. A secondary electron yield of about two may be obtained for an electron range of 200V-500V utilizing a stainless steel SEM surface. Thus, a use of 7-10 stages of stainless steel surfaces with a potential change of 200V-500V per stage enables a robust and stable amplification stage with an amplification value of about 10 times-100 times amplification. The low amplification value preserves the damage of a stainless steel surface, and, thus, elongates a life time of this SEM 140. Similar to the MCP plate of scheme 136 and scheme 138, the use of the SEM 140 allows discrimination of slow luminescence photons.

Figure 20:
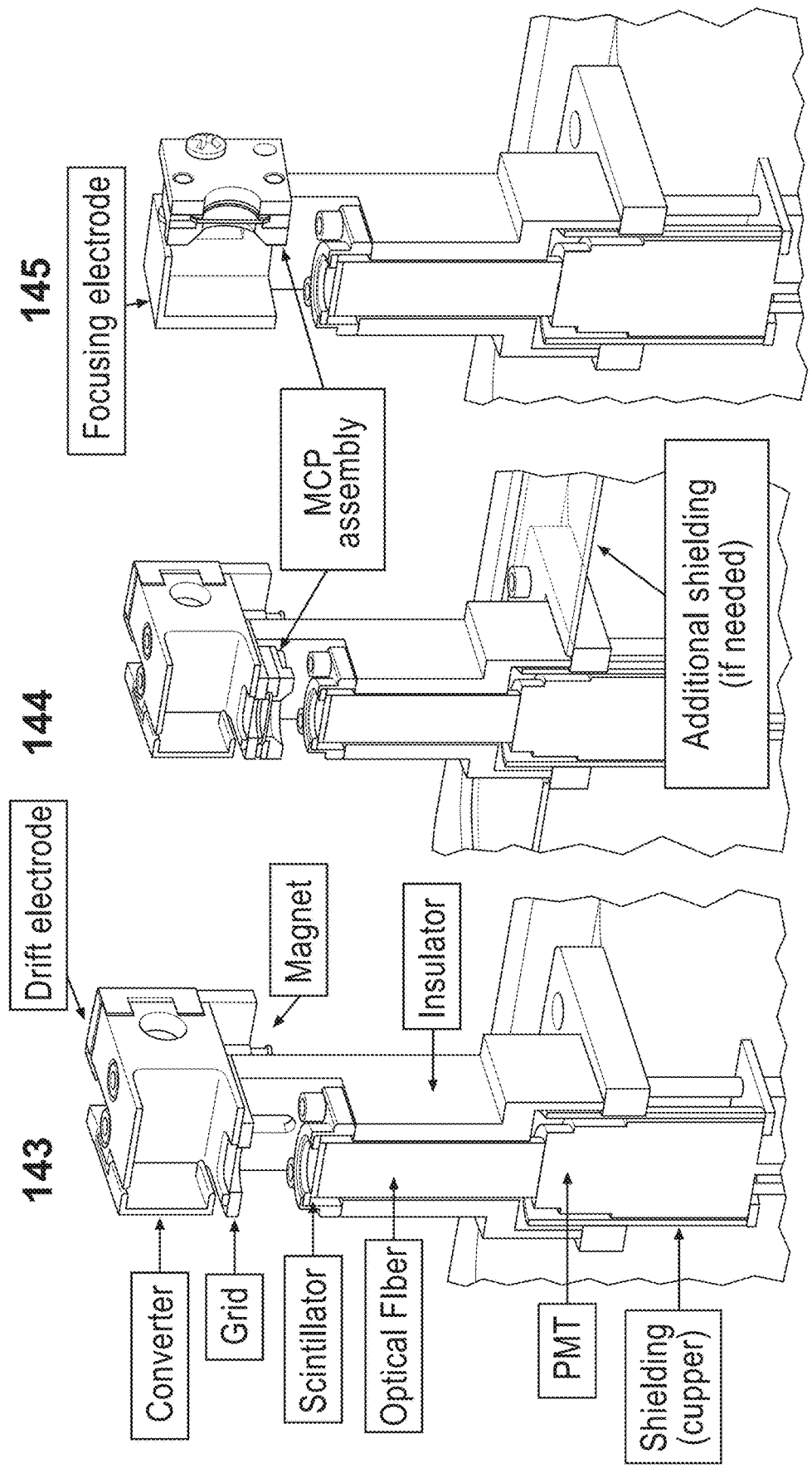
FIG. 20 shows a mechanical design of some schemes from FIG. 19.

Referring to FIG. 20, mechanical designs 143, 144, 145 correspond to the detector schemes from FIG. 19 (131,136 and 138, respectively). Notably, these mechanical designs allow flexible changes between detector sets.

Compensation of Analyzer and Detector Aberrations

Figure 21:
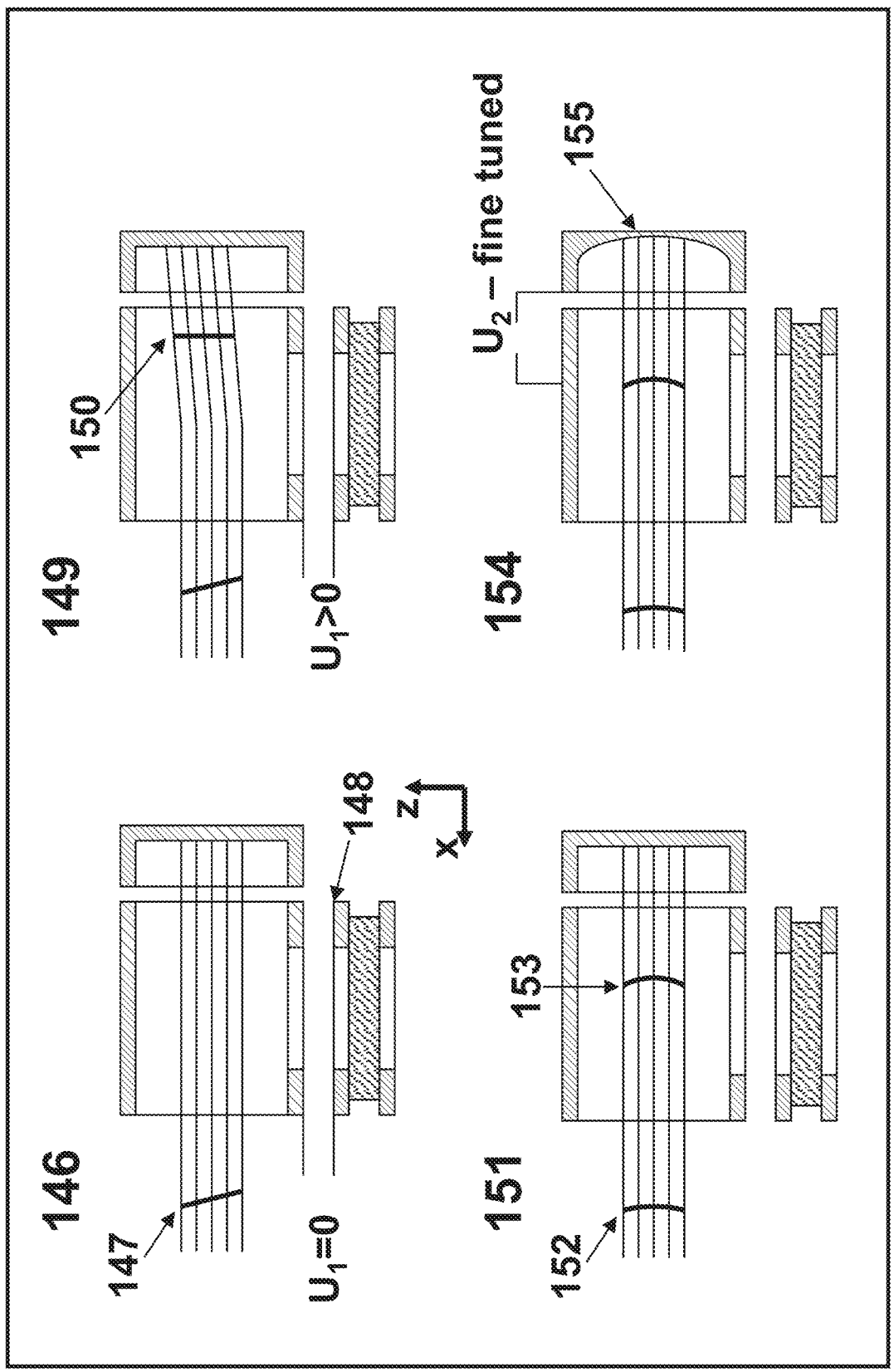
FIG. 21 illustrates schemes for compensating (T|Z) and (T|ZZ) aberrations of the detector and analyzer.

Referring to FIG. 21, suggested schemes 146, 149, 151, 154 each allow first order Z-aberration (T|Z) 147 compensation and second order Z-aberration (T|ZZ) 152 compensation within a detector body. The first order Z-aberration 147 could be compensated by deflecting of an ion beam. The ion beam deflection could be accomplished by decoupling of an MCP assembly 148 from a drift region, as shown in the scheme 146. In this scheme 146, a potential difference $U_1$ between drift region and MCP assembly 146 is applied. Scheme 149, in the case of positive ions, a positive $U_1$ potential difference should be applied on the MCP assembly 148 to deflect an ion beam 150 to compensate for a positive (T|Z) aberration 147. MCP assembly 148 is optionally replaced with a grid if a scheme without an MCP is used. This grid is decoupled from the drift region similarly to the case of MCP assembly 148.

Scheme 151, the second order Z aberration (T|ZZ) (i.e. spherical aberration) 152 is present in an MR-TOF analyzer 31 as a result of a periodic lens system 36 and has a positive value. The detector itself has a positive (T|ZZ) aberration 153 (as illustrated further in FIG. 5). A value of the detector's (T|ZZ) aberration 153 is determined by a potential difference between a drift region and a converter plate. In scheme 154 a curved converter electrode 155 is used to compensate both analyzer and detector (T|ZZ) aberrations 152, 153. The curvature of the converter electrode 155 could be determined from a SIMION model, whereas a fine tune of a potential difference between a drift region and a converter plate $U_2$ allows (T|ZZ) compensation optimizing an ion peak width. For example, the aberrations shown in FIG. 5 could be compensated by a curved converter electrode 155 with a curvature radius of 180 mm. Notably, the higher $U_2$ values requires smaller values of a curvature radius.

While this specification contains many specifics, these should not be construed as limitations to the scope of this disclosure or of what may be claimed, but rather as descriptions of features specific to particular implementations of the disclosure. Certain features that are described in this specification in the context of certain implementations can also be implemented within other implementations. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A time-of-flight detector, comprising:
   a conductive converter exposed parallel to a time-front of detected ion packets and generating secondary electrons;
   at least one electrode with a side window, wherein the converter is negatively floated relative to the electrode by a voltage difference between 100V and 1000V;
   at least one magnet with magnetic field strength between 10 Gauss and 1000 Gauss for bending electron trajectories towards said side window;
   a scintillator floated positively relative to a surface of said converter by 1 kV to 20 kV and located past said side window at 45 degrees to 180 degrees relative to said converter; and
   a sealed photo-multiplier past said scintillator.

2. A detector as in claim 1, wherein said scintillator is either coated or covered by a conductive mesh for removing surface charge from a surface of said scintillator.

3. A detector as in claim 1, wherein said scintillator is optically coupled to said sealed photo-multiplier.

4. A detector as in claim 1, wherein a positioning of said at least one magnet is adjusted for spatial focusing of said secondary electrons by a curvature of said magnetic field.

5. A detector as in claim 1, wherein said converter surface is curved or stepped for compensating time-per spatial spherical aberrations.

6. A detector as in claim 1, wherein said converter surface is electronically tilted relative to said time-front of said ion packets by applying a potential bias at or past said side window.

7. A detector as in claim 1, further comprising a mesh or discrete dynode electron amplifier between said converter and said scintillator.

8. A detector as in claim 1, further comprising a microchannel plate set at an electron amplification gain under 100.

9. A detector as in claim 1, further comprising an elongated optical coupling between said scintillator and said sealed photo-multiplier, and wherein said sealed photo-multiplier is placed on an atmospheric side of said scintillator.

10. A multi-reflecting mass spectrometer comprising the detector of claim 1.

11. A detector as in claim 1, further comprising a mesh-based secondary electron multiplier accepting said secondary electrons from said converter.

12. A detector as in claim 11, wherein the mesh-based secondary electron multiplier includes a plurality of steel mesh surfaces, wherein each steel mesh surface defines a potential difference between 200V and 500V relative to each of the other steel mesh surfaces.

13. A detector as in claim 1, wherein said side window includes a mesh coating.

14. A right angle time-of-flight detector, comprising:
    a single microchannel plate for converting detected ion packets into secondary electrons;
    an electrostatic bender of secondary electron;

a scintillator floated positively relative to said microchannel plate by 1 kV to 20 kV and located past said microchannel plate at 45 degrees to 90 degrees; and
a sealed photo-multiplier past the scintillator.

15. A detector as in claim 14, wherein an electromagnetic shielding associates with said sealed photo-multiplier.

16. A detector as in claim 14, wherein said scintillator optically connects to said sealed photo-multiplier through a light transmitter.

\* \* \* \* \*